US011473630B2

(12) United States Patent
Fish et al.

(10) Patent No.: US 11,473,630 B2
(45) Date of Patent: Oct. 18, 2022

(54) ROTOR DRIVE KEY ASSEMBLY

(71) Applicant: Honeywell International Inc., Morris Plains, NJ (US)

(72) Inventors: Bradley E. Fish, Elkhart, IN (US); Jonathan T. Beehler, Bremen, IN (US)

(73) Assignee: Honeywell International Inc., Charlotte, NC (US)

( * ) Notice: Subject to any disclaimer, the term of this patent is extended or adjusted under 35 U.S.C. 154(b) by 237 days.

(21) Appl. No.: 16/843,494

(22) Filed: Apr. 8, 2020

(65) Prior Publication Data

US 2021/0317880 A1 Oct. 14, 2021

(51) Int. Cl.
*F16D 65/02* (2006.01)
*F16D 3/06* (2006.01)
*F16D 65/12* (2006.01)
*B64C 25/44* (2006.01)
*F16D 55/36* (2006.01)

(52) U.S. Cl.
CPC ............. *F16D 3/06* (2013.01); *F16D 65/123* (2013.01); *B64C 25/44* (2013.01); *F16D 55/36* (2013.01); *F16D 2065/1364* (2013.01); *F16D 2065/1392* (2013.01); *F16D 2250/0084* (2013.01)

(58) Field of Classification Search
CPC ......... B64C 25/36; B64C 25/42; B64C 25/44; F16D 65/02; F16D 65/12; F16D 65/123–127
USPC ................................ 188/18 A, 71.5, 218 XL
See application file for complete search history.

(56) References Cited

U.S. PATENT DOCUMENTS

| 3,345,109 | A | 10/1967 | Petersen et al. |
| 4,084,857 | A | 4/1978 | VanderVeen |
| 5,186,521 | A * | 2/1993 | Niespodziany ......... F16D 55/36 188/264 G |
| 5,199,536 | A | 4/1993 | Clark |
| 6,003,954 | A | 12/1999 | Everhard et al. |
| 7,546,910 | B2 | 6/2009 | Thorp et al. |
| 8,157,062 | B2 * | 4/2012 | Enright ................... F16D 55/36 188/71.5 |
| 8,430,457 | B2 | 4/2013 | Baldassara |
| 9,718,317 | B2 | 8/2017 | Kendricks |

(Continued)

FOREIGN PATENT DOCUMENTS

EP    0398092 A1    11/1990

OTHER PUBLICATIONS

Extended Search Report from counterpart European Application No. 21164117.0, dated Jul. 2, 2021, 7 pp.

(Continued)

*Primary Examiner* — Christopher P Schwartz
(74) *Attorney, Agent, or Firm* — Shumaker & Sieffert, P.A.

(57) ABSTRACT

In some examples, a rotor drive key assembly configured to be positioned on a wheel includes an insert and a rotor drive key. The insert is configured to mate with a wheel boss of the wheel and mechanically connect the rotor drive key with the wheel boss. The rotor drive key is configured to mate with the insert such that the insert limits movement of the rotor drive key relative to the wheel boss in at least a radial direction of the wheel. In some examples, the rotor drive key includes a tab having a tab aperture configured to receive a fastener extending in an axial direction of the wheel and engaging the wheel boss.

20 Claims, 10 Drawing Sheets

(56) References Cited

U.S. PATENT DOCUMENTS

| | | | |
|---|---|---|---|
| 2006/0006729 A1* | 1/2006 | Rutten | F16D 65/123 |
| | | | 301/6.2 |
| 2010/0025172 A1 | 2/2010 | Campbell | |
| 2014/0175860 A1* | 6/2014 | Crescenzo | B64C 25/36 |
| | | | 301/64.305 |
| 2017/0174330 A1* | 6/2017 | Rook | B64C 25/44 |
| 2019/0120304 A1* | 4/2019 | Laget | B64C 25/42 |
| 2020/0102069 A1 | 4/2020 | Beehler et al. | |
| 2021/0332865 A1* | 10/2021 | Lindner | F16D 65/123 |

OTHER PUBLICATIONS

Response to Extended Search Report dated Jul. 2, 2021, from counterpart European Application No. 21164117.0, filed Jul. 5, 2021, 50 pp.

U.S. Appl. No. 16/832,868, by Honeywell International, Inc. (Inventors: Fish et al.), filed Mar. 27, 2020.

Notice of Intent to Grant and Text Intended to Grant from counterpart European Application No. 21164117.0, dated Mar. 4, 2022, 52 pp.

* cited by examiner

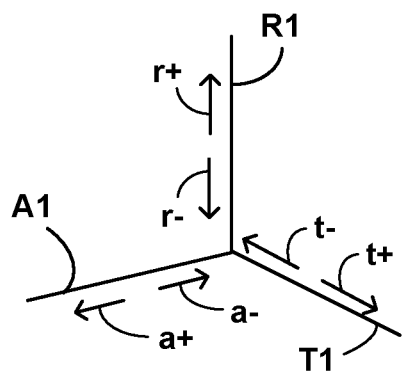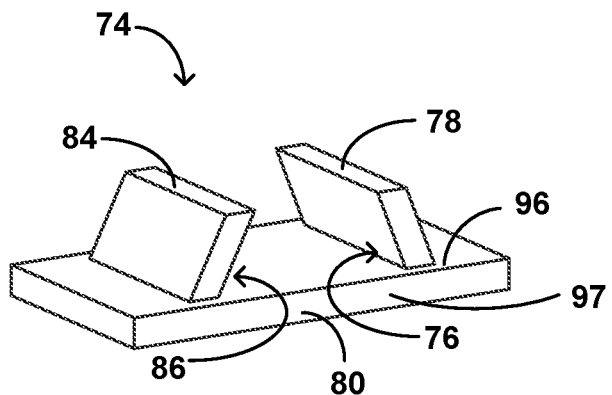
FIG. 5
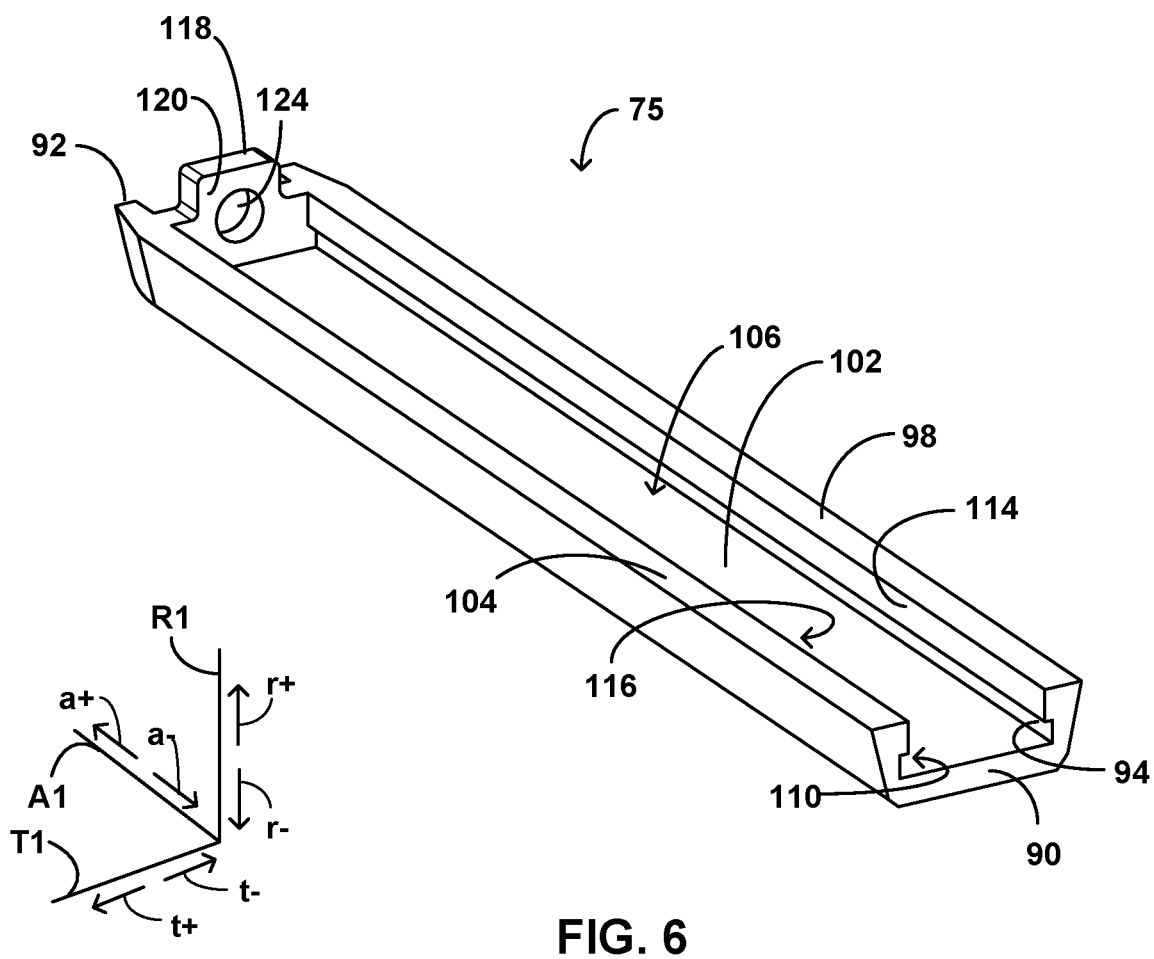
FIG. 6

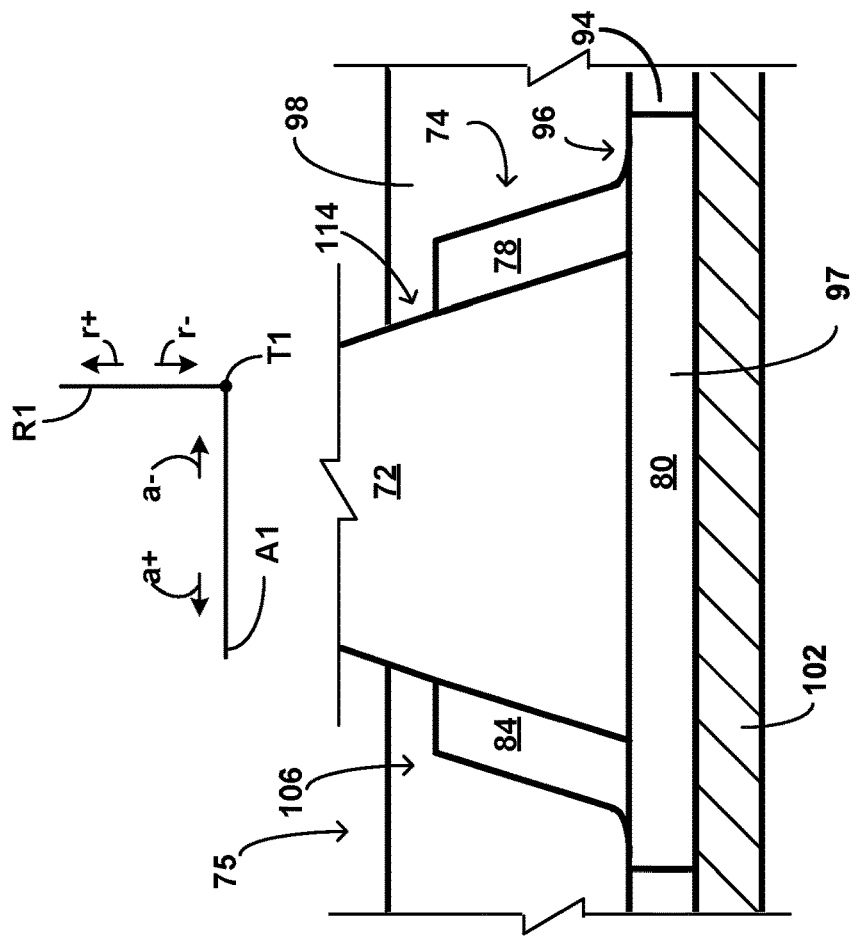
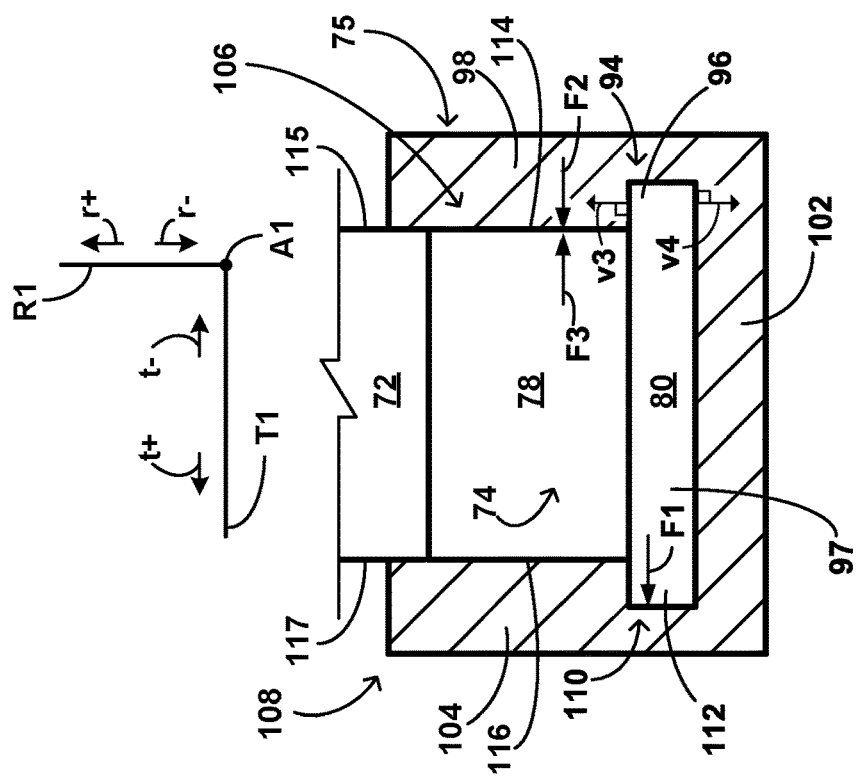

ROTOR DRIVE KEY ASSEMBLY

TECHNICAL FIELD

The present disclosure relates to wheel brake systems of vehicles.

BACKGROUND

Vehicles, such as aircrafts, may use a wheel brake system that includes a multi-disc brake assembly. For example, the multi-disc brake assembly may include a plurality of rotors engaged with a wheel and a plurality of stators interleaved with the rotors. The rotors and wheel are configured to rotate around an axle, while the stators remain stationary. To decelerate rotational motion of a rotating wheel, the brake assembly may displace pistons against a pressure plate to squeeze the rotating rotors engaged with the wheel against the stationary stators, therefore producing torque that decelerates the rotational motion of the wheel. In some examples, the rotors may be engaged with the wheel via rotor drive keys positioned on an interior surface of the wheel. In some such examples, the rotors may define slots configured to receive the rotor drive keys.

SUMMARY

In some examples, a rotor drive key assembly includes a rotor drive key and an insert configured to be positioned over a wheel boss defined by a wheel. The insert is configured to mate with a wheel boss and mechanically connect the rotor drive key with the wheel boss. In some examples, the insert is configured to mate with the wheel boss such that the wheel boss limits movement of the insert relative to the wheel boss in at least a radial direction of the wheel. The insert may be configured to mate with the wheel boss when the insert translates over the wheel boss in a tangential direction of the wheel. The rotor drive key is configured to mate with the insert, such that the insert (when mated with the wheel boss) limits movement of the rotor drive key relative to the wheel boss in at least the radial direction of the wheel. The rotor drive key may be configured to mate with the insert when the rotor drive key translates over the insert in an axial direction of the wheel.

In some examples, the rotor drive key defines a substantially U-shaped cross-section configured to at least partially surround the insert and a wheel boss when the insert is mated with the wheel boss and the rotor drive key is mated with the insert. The rotor drive key may be configured such that the U-shaped cross-section causes the rotor drive key to engage the wheel boss when the rotor drive key experiences a force in a tangential direction of the wheel, limiting relative movement of the rotor drive key. The rotor drive key may be configured such that the insert engages some portion of the U-shaped cross-section to limit movement of the insert in the tangential direction of the wheel. In examples, the insert is configured to translate over the wheel boss in a tangential direction of the wheel to mate with the wheel boss and, when the rotor drive key mates with the insert, the U-shaped cross-section is configured to prevent motion of the insert in the tangential direction, such that the insert is substantially trapped by the rotor drive and the wheel boss within the assembly.

In some examples, the rotor drive key is configured to receive a fastener extending in an axial direction of the wheel. The fastener may engage the wheel boss to limit motion (e.g., prevent or substantially prevent motion) of the rotor drive key relative to the wheel in an axial direction of the wheel.

Clause 1: An assembly comprising: an insert configured to mate with a wheel boss of a wheel; and a rotor drive key configured to mate with the insert, wherein the insert is configured to mechanically connect the rotor drive key with the wheel boss, and wherein the insert is between the rotor drive key and the wheel boss when the insert mechanically connects the rotor drive key with the wheel boss.

Clause 2: The assembly of clause 1, wherein the insert defines at least one of a recess configured to receive a protrusion defined by the wheel boss or a protrusion configured to insert in a recess defined by the wheel boss to mate with the wheel boss.

Clause 3: The assembly of clause 2 or 3, wherein the rotor drive key defines at least one of a recess configured to receive a protrusion defined by the insert or a protrusion configured to insert in a recess defined by the insert to mate with the insert.

Clause 4: The assembly of any of clauses 1 to 3, wherein the insert is configured to be translated over the wheel boss in a substantially tangential direction of the wheel to mate with the wheel boss.

Clause 5: The assembly of any of clauses 1 to 4, wherein the insert is configured to limit movement of the insert relative to the wheel boss in a substantially radial direction of the wheel when the insert mates with the wheel boss.

Clause 6: The assembly of any of clauses 1 to 5, wherein the insert is configured to limit movement of the insert relative to the wheel boss in a substantially axial direction of the wheel when the insert mates with the wheel boss.

Clause 7: The assembly of any of clauses 1 to 6, wherein the rotor drive key is configured to be translated over the insert in a substantially axial direction of the wheel to mate with the insert.

Clause 8: The assembly of any of clauses 1 to 7, wherein the insert is configured to limit movement of the rotor drive key relative to the wheel boss in a substantially radial direction of the wheel when the rotor drive key mates with the insert and the insert mates with the wheel boss.

Clause 9: The assembly of any of clauses 1 to 8, wherein the rotor drive key is configured to limit movement of the insert relative to the wheel boss in a substantially tangential direction of the wheel when the rotor drive key mates with the insert and the insert mates with the wheel boss.

Clause 10: The assembly of any of clauses 1 to 9, wherein the rotor drive key is configured to receive a fastener in a substantially axial direction of the wheel when the rotor drive key mates with the insert and the insert mates with the wheel boss.

Clause 11: The assembly of any of clauses 1 to 10, wherein the fastener is configured to engage a portion of the wheel comprising the wheel boss when the rotor drive key receives the fastener in the substantially axial direction of the wheel and when the rotor drive key mates with the insert and the insert mates with the wheel boss.

Clause 12: The assembly of any of clauses 1 to 11, wherein: the insert is configured to limit movement of the insert relative to the wheel boss in an axial direction of the wheel and in a radial direction of the wheel when the insert mates with the wheel boss; and the rotor drive key is configured to limit movement of the insert relative to the wheel boss in a tangential direction of the wheel when the rotor drive key mates with the insert and the insert mates with the wheel boss.

Clause 13: The assembly of any of clauses 1 to 12, wherein: the insert is configured to exert a reaction force on the rotor drive key in a substantially radial direction of the wheel when the rotor drive key is mated with the insert and the insert is mated with the wheel boss; and the insert is configured to exert some portion of the reaction force on the wheel boss when the insert is mated with the wheel boss.

Clause 14: An assembly comprising: a wheel boss extending in a substantially radial direction of a wheel and defining a boss protrusion protruding in a substantially axial direction of the wheel; an insert defining an insert recess configured to receive the boss protrusion, wherein the insert defines an insert protrusion protruding in a substantially tangential direction of the wheel; and a rotor drive key defining a key recess configured to receive the insert protrusion.

Clause 15: The assembly of clause 14, wherein the insert is configured to receive the boss protrusion when the insert is translated over the wheel boss in the substantially tangential direction of the wheel.

Clause 16: The assembly of clause 15, wherein the key recess is configured to receive the insert protrusion when the insert recess receives the boss protrusion and the rotor drive key is translated over the insert in the substantially axial direction of the wheel.

Clause 17: The assembly of clauses 15 or 16, further comprising a fastener, wherein the rotor drive key is configured to receive the fastener in the substantially axial direction of the wheel, and the fastener is configured to engage the wheel boss and limit motion of the rotor drive key in the substantially axial direction of the wheel when the rotor drive key receives the fastener.

Clause 18: A method comprising: mating an insert and a wheel boss of a wheel, wherein the wheel boss extends in a substantially radial direction of the wheel; and mechanically connecting a rotor drive key and the wheel boss, wherein mechanically connecting the rotor drive key and the wheel boss comprises mating the rotor drive key and the insert, and wherein the insert is between the rotor drive key and the wheel boss when the insert mechanically connects the rotor drive key with the wheel boss.

Clause 19: The method of clause 18 further comprising extending a fastener through the rotor drive key and into the wheel boss in a substantially axial direction of the wheel when the rotor drive key mates with the insert.

Clause 20: The method of clause 18 or 19, wherein mating the insert and the wheel boss comprises translating the insert over the wheel boss in a substantially tangential direction of the wheel, and wherein mating the rotor drive key and the insert comprises translating the rotor drive key over the insert in a substantially axial direction of the wheel.

An example technique for attaching the rotor drive key to an interior surface of a wheel is additionally described herein.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a perspective view of an example insert.

FIG. 6 is a perspective view of an example rotor drive key.

FIG. 8A is a plan view with selected cross-sections of an example rotor drive key, an example insert, and a section of an example wheel boss.

FIG. 8B is another plan view with selected cross-sections of the rotor drive key, the insert, and the section of the wheel boss of FIG. 8B.

DETAILED DESCRIPTION

Figure 1:
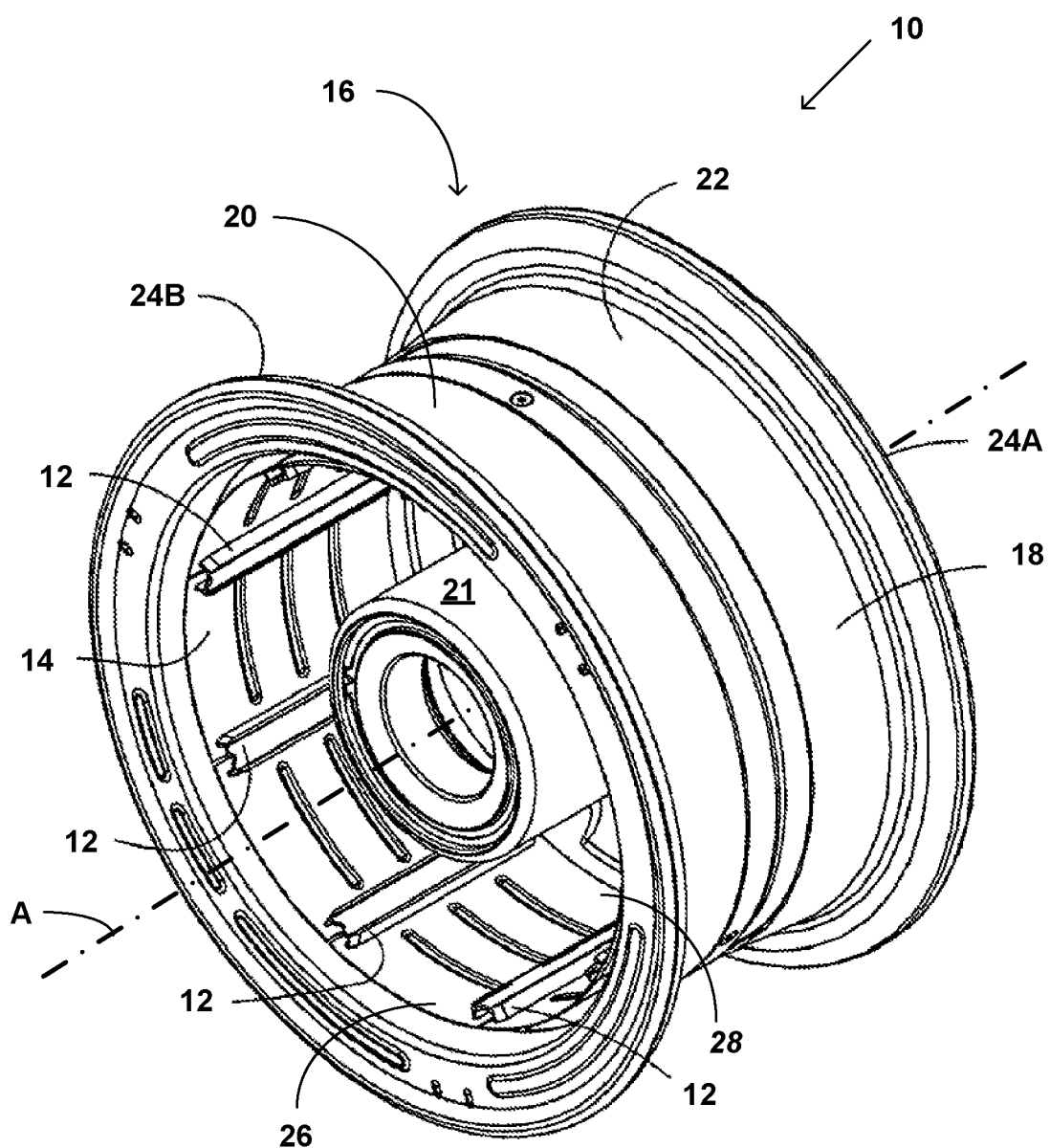
FIG. 1 is a perspective view of an example wheel including a plurality of rotor drive keys on an interior surface of the wheel.

The disclosure describes articles, systems, and techniques relating to rotor drive keys of a wheel brake system of a vehicle, and assemblies for connecting a rotor drive key to a vehicle wheel. In some examples, a rotor drive key assembly includes a rotor drive key and an insert configured to mechanically connect the rotor drive key to a wheel boss. The rotor drive key assemblies described herein are configured to be attached to an interior surface of a wheel. The interior surface of the wheel defines at least one wheel boss, and the rotor drive key assembly is configured to be positioned over the wheel boss. The wheel boss may extend in a substantially radial direction (e.g., radial or nearly radial to the extent permitted by manufacturing tolerances) of the wheel, and the rotor drive key assembly may extend in a substantially axial direction (e.g., axial or nearly axial to the extent permitted by manufacturing tolerances) of the wheel when positioned over the wheel boss.

In some examples, the insert is configured to mate with a wheel boss and a rotor drive key is configured to mate with the insert. The insert is positioned between the rotor drive key and the wheel boss when the insert mates with the wheel boss and the rotor drive key mates with the insert. The insert acts to mechanically connect the rotor drive key and the wheel boss, such that when the rotor drive key is subject to force in at least a radial direction of the wheel, the insert transmits some portion of the force to the wheel boss. The wheel boss acts to exert an opposing reaction force on the insert, and the insert acts to exert a reaction force on the rotor drive key to limit motion of the rotor drive key relative to the wheel boss.

The insert may be configured to mate with the wheel boss when the insert translates over the wheel boss in a tangential direction of the wheel. The insert is configured such that, when mated with wheel boss, forces on the insert in a radial direction of the wheel transmit to the wheel boss, and the wheel boss exerts an opposing reaction force on the insert to limit relative motion of the insert (e.g., motion relative to the wheel boss). The insert may be also configured such that, when mated with wheel boss, the insert transmits forces acting on the insert in an axial direction of the wheel to the wheel boss, such that the wheel boss exerts an opposing axial reaction force on the insert. Thus, the mating between the insert and the wheel boss can cause the insert to transmit forces to the wheel boss in the axial and radial directions of the wheel. The opposing reaction forces exerted by the wheel boss limit relative movement of the insert relative to the wheel boss in the axial and radial directions of the wheel.

The rotor drive key may be configured to mate with the insert when the rotor drive key translates over the insert in an axial direction of the wheel. The rotor drive key is configured such that, when mated with the insert, forces on the rotor drive key in at least a radial direction of the wheel transmit to the insert. When the insert is mated with the wheel boss, transmission of the radial forces by the rotor drive key cause the insert to exert opposing reaction forces to limit motion of the rotor drive key relative to the wheel boss in the radial direction of the wheel. Thus, the mating between the rotor drive key and the insert (when the insert is mated with the wheel boss) can cause the rotor drive key to transmit forces to the insert in the radial directions of the wheel. The opposing reaction forces exerted by the insert limit relative movement of the rotor drive key relative to the insert in at least the radial direction of the wheel.

The rotor drive key can have any suitable configuration that enables it to mate with an insert in accordance with the examples described herein. In some examples, the rotor drive key includes a key base section, a key first side, and a key second side, with the key first side and the key second side extending from the key base section to define a substantially U-shaped cross-section that enables the rotor drive key to at least partially surrounds the wheel boss when the rotor drive key mates with the insert. The key first side and/or the key second side may be configured to engage a side of the wheel boss (e.g., a side extending along an axial direction of the wheel) when the rotor drive key experiences a force in a tangential direction of the wheel. The key first side and/or the key second side may transmit the tangential force to the wheel boss, such that the wheel boss exerts an opposing reaction force on the key first side and/or key second side to limit motion of the rotor drive key relative to the wheel boss in the tangential direction of the wheel. The rotor drive key may be configured to at least partially surround the insert, such that the rotor drive key traps the insert against movement relative to the wheel boss in the tangential direction of the wheel.

The mating between the insert and the wheel boss can be established using any suitable structure. For example, in some examples, the insert defines an insert recess configured to receive a wheel boss protrusion and/or defines an insert protrusion configured to insert into a recess defined by the wheel boss ("boss recess"). In some examples, the boss protrusion may taper outwardly in a direction towards a center axis of rotation of the wheel and the insert has a corresponding inner surface that defines the insert recess. In some examples, in addition to or instead of the insert recess, an axially extending protrusion defined by the insert may be configured to insert into a boss recess when the insert translates over the wheel boss in the tangential direction, with the protrusion of the insert configured such that a force on the insert in a radial direction of the wheel transmits to the wheel boss.

The mating between the rotor drive key and the insert can be established using any suitable structure. For example, in some examples, the rotor drive key defines a key recess configured to receive an insert protrusion defined by the insert and/or defines a key protrusion configured to insert into a recess defined by the insert. In some examples, the key recess is configured to extend inwardly in a tangential direction of the wheel to receive the insert protrusion extending outwardly in the tangential direction of the wheel. In some examples, in addition to or instead of the key recess, a tangentially extending protrusion defined by the rotor drive key may be configured to insert into a recess defined by the insert when the rotor drive key translates over the insert in the axial direction. The protrusion of the rotor drive key may be configured such that a force on the rotor drive key in a radial direction of the wheel transmits to the insert.

In some examples, the rotor drive key further includes a tab configured to oppose relative motion of the rotor drive key in an axial direction of the wheel when the rotor drive key is mated with the insert. The tab may define a tab bearing surface configured to engage a portion of the wheel (e.g., a wheel boss) when the rotor drive key mates with the insert. The tab may be configured to establish and/or maintain mechanical connection between the rotor drive key and the wheel (e.g., a wheel boss) such that axial reaction forces from the wheel transmit to the rotor drive key and substantially secure the rotor drive against movement in the axial direction of the wheel.

In some examples, the tab is configured to receive a fastener in a substantially axial direction of the wheel. The fastener may be configured to extend through the tab (e.g., through a tab aperture) into a portion of the wheel (e.g., a wheel boss). The fastener may engage the wheel boss (e.g., threadably engage) to substantially maintain the tab of the rotor drive key in a particular position relative to the wheel. For example, the fastener may substantially maintain the tab in contact with a portion of the wheel, and/or maintain the tab in contact with one or more materials (e.g., a compression washer) between the tab and the portion of the wheel.

When the insert mates with the wheel boss, the rotor drive key mates with the insert, and the fastener extends axially through the rotor drive key and into a portion of the wheel (e.g., a wheel boss), the rotor drive key may be substantially anchored against relative movements in the axial, tangential, and radial directions of the wheel. As used herein, relative movement of a rotor drive key refers to movement of the rotor drive key relative to the wheel (e.g., the wheel boss) when the rotor drive key is mated with the insert and the insert is mated with the wheel boss. Relative movement of an insert refers to movement of the insert relative to the wheel (e.g., the wheel boss) when the insert is mated with the wheel boss. Hence, in some examples, the rotor drive key and/or insert may experience substantially zero relative motion in the radial, tangential, and/or axial directions as the wheel, the rotor drive key, and the insert together experience a motion (e.g., radial, tangential, and/or axial motion) measured with reference to a point removed from the wheel and the rotor drive key.

Example rotor drive key assemblies described herein are configured to secure against an interior surface of a wheel using the insert mated with a wheel boss, the rotor drive key mated with the insert, and, in some examples, the tab configured to encounter a portion of the wheel. For example, the insert can be configured to transmit at least radial forces on the rotor drive key to the wheel boss. As another example, in examples in which a rotor drive key defines a key first side and a key second side defining a U-shaped cross-section, the rotor drive key is configured such that the key first side and/or the key second side transmit tangential forces on the rotor drive key to the wheel boss. The tab is configured to transmit axial forces on the rotor drive key to the wheel boss. This radial, tangential, and axial support of the rotor drive key assembly may enable one or more bolts oriented along a radial wheel axis or perpendicular to a length of a rotor drive key to be eliminated from the assembly.

Bolts oriented along a radial wheel axis or otherwise perpendicular to a length of a rotor drive key may be more difficult to install than the substantially axially extending fasteners described herein, e.g., may require a special right angle tool to install the bolt. Further, bolts oriented along a radial wheel axis or otherwise perpendicular to a length of a rotor drive key may be more likely to become unattached to an interior surface of the wheel compared to the conforming rotor drive key and axially oriented fastener described herein. For instance, heat cycling, vibration, or the like may result in the bolt becoming loose or even completely unattached to the rotor drive key and the wheel assembly. In addition, there may not be sufficient radial clearance in the wheel assembly for a nut or other retaining mechanism to be used with a bolt that extends in the radial direction. Loosening of the bolt may cause the rotor drive key to be unsecured to the wheel, which may decrease the useful life of the rotor drive key and/or wheel, and interrupt the function of the braking assembly for the wheel, increase maintenance costs, result in premature replacement of the rotor drive key, or the like.

FIG. 1 is a perspective view illustrating an example wheel 10 including a plurality of rotor drive keys 12 on an interior surface 14 of wheel 10. In some examples, wheel 10 is a part of an aircraft vehicle. In other examples, wheel 10 may be a part of any other vehicle, such as, for example, any marine vessel, land vehicle, or other vehicle. Wheel 10 may include a rim 16 defining an exterior surface 18 and interior surface 14. Rim 16 may include tubewell 20, wheel hub 21, and wheel outrigger flange 22. In some examples, interior surface 14 may include an inner diameter of tubewell 20 of wheel 10. For example, in some cases, interior surface 14 may be referred to as an inner diameter surface of wheel 10.

In some examples, a tire (not shown) may be mounted on exterior surface 18 of rim 16. For example, wheel 10 may include an inboard bead seat 24B and an outboard bead seat 24A configured to retain a tire on exterior surface 18 of rim 16.

Wheel 10 is configured to engage with one or more rotors (not shown in FIG. 1) of a braking assembly. For example, as shown in the example of FIG. 1, a plurality of rotor drive keys 12 are positioned along interior surface 14, and each rotor drive key of the plurality of rotor drive keys 12 may be configured to engage with one or more rotors of a brake disc stack of a braking assembly. An example braking assembly will be described in more detail with respect to FIG. 2.

In some examples, each rotor drive key of the plurality of rotor drive keys 12 extends in a substantially axial direction of wheel 10 (e.g., in a direction parallel to the axis label "A" in FIG. 1, which can be an axis of rotation of wheel 10). For example, a length of each rotor drive key of the plurality of rotor drive keys 12 may extend in the substantially axial (e.g., axial or nearly axial to the extent permitted by manufacturing tolerances) direction of the axis A. In some such examples, the respective length of each rotor drive key 12 may extend from (or near) a first edge 26 of wheel 10 to (or close to) a second edge 28 of wheel 10. In this way, in some examples, a length of a rotor drive key 12 of the plurality of rotor drive keys 12 may be the same or substantially similar to (e.g., within 10%) a width of wheel 10 from first edge 26 to second edge 28. In other examples, a length of a rotor drive key 12 may be less than the width of wheel 10.

The plurality of rotor drive keys 12 extending in the substantially axial direction may enable wheel 10 to slide onto a braking assembly. For example, a plurality of rotors of a braking assembly may include drive slots configured to receive the plurality of rotor drive keys 12, enabling the plurality of rotor drive keys 12 to be slid into respective drive slots of the plurality of rotors. In other examples, one or more rotor drive keys of the plurality of rotor drive keys 12 may be oriented in a different direction and/or may engage with one or more rotors in a different manner.

The plurality of rotor drive keys 12 may include any suitable number of rotor drive keys. The number of drive keys may be vehicle specific and may depend on, e.g., loads, size of parts, material property, and the like. In some examples, the number of the rotor drive keys included in the plurality of rotor drive keys 12 may correspond to a number of drive slots defined by a plurality of rotors of a braking assembly configured to receive the plurality of rotor drive keys 12. For example, each rotor drive key of the plurality of rotor drive keys 12 may correspond to a respective slot defined by the plurality of rotors of a braking assembly.

As illustrated in the example of FIG. 1, in some examples, the plurality of rotor drive keys 12 may be mounted at substantially equal circumferential distances around interior surface 14 of wheel 10. In other examples, one or more of the plurality of rotor drive keys 12 may be mounted a different circumferential distance from an adjacent rotor drive than at least one other rotor drive key. Here and elsewhere, circumferential distance means the length of an arc (e.g., on the interior surface 14 of wheel 10 where the arc is in a plane perpendicular to the substantially axial direction of wheel 10 in this specific example). Rotor drive keys 12 may be integrally formed with tubewell 20 or may be separate from and mechanically affixed to tubewell 20.

As discussed in further detail below, one or more of the rotor drive keys of plurality of rotor drive keys 12 are configured to be mechanically coupled to a wheel boss via an insert positioned between the rotor drive key and the wheel boss. The insert is configured to mate with the wheel boss such that the wheel boss limits relative movement of the insert in a radial direction of wheel 10 (e.g., a direction from axis A toward interior surface 14 and/or from interior surface 14 toward axis A). A rotor drive key of plurality of rotor drive keys 12 is configured to mate with the insert such that the insert, when mated with the wheel boss, limits relative movement of rotor drive key 12 in a radial direction of wheel 10. The rotor drive key may partially surround the insert when the rotor drive key extends in the axial direction of wheel 10, in order to substantially limit relative motion of the insert in the tangential direction of wheel 10.

Figure 2:
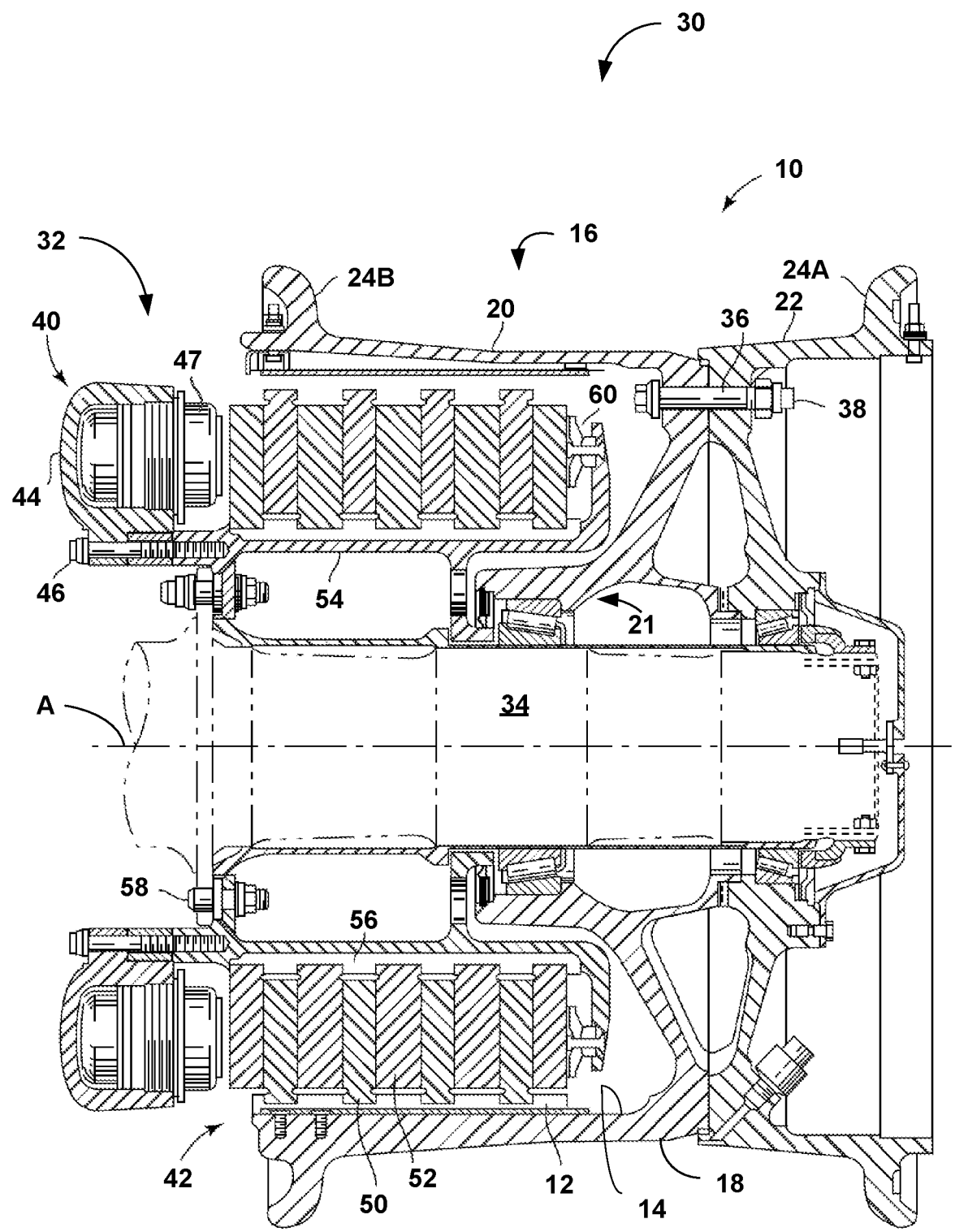
FIG. 2 is a schematic cross-sectional view of an example wheel and brake assembly including the wheel of FIG. 1.

FIG. 2 is a schematic cross-sectional view illustrating an example wheel and brake assembly 30 including an example wheel 10 and a brake assembly 32. Wheel and brake assembly 30 is shown and described to provide context to the example rotor drive key and assemblies including the rotor drive keys and fasteners described herein. The rotor drive keys, fasteners, and other wheel assembly structures described herein, however, may be used with any suitable wheel and brake assembly in other examples.

Wheel 10 includes plurality of rotor drive keys 12, interior surface 14, rim 16, exterior surface 18, tubewell 20, wheel hub 21, wheel outrigger flange 22, outboard bead seat 24A, and inboard bead seat 24B. Wheel 10 may be configured to be rotatably carried on fixed axle 34. In turn, wheel 10 may impart motion to a vehicle including or mounted on the wheel and brake assembly 30. In the example shown in FIG. 2, tubewell 20 and wheel outrigger flange 22 are mechanically coupled by lug bolt 36 and lug nut 38. Other connection techniques may be used in other examples.

Brake assembly 32 includes an actuator assembly 40 and a brake stack 42. Actuator assembly 40 includes actuator housing 44, actuator housing bolt 46, and ram 47. Brake stack 42 includes interleaved rotor brake discs 50 and stator brake discs 52. Rotor brake discs 50 are configured to move relative to stator brake discs 52, e.g., rotationally about axis A and axially along axis A relative to stator brake discs 52. Rotor brake discs 50 are engaged (e.g., interface) with wheel 10, and in particular tubewell 20, by rotor drive keys 12. Stator brake discs 52 are mounted to torque tube 54 by splines 56. Wheel and brake assembly 30 may support any variety of private, commercial, or military aircraft or other type of vehicle.

Wheel and brake assembly 30 may be mounted to a vehicle via torque tube 54 and axle 34. In the example of FIG. 2, torque tube 54 is affixed to axle 34 by a plurality of bolts 58. Torque tube 54 supports actuator assembly 40 and stator brake discs 52. Axle 34 may be mounted on a strut of a landing gear (not shown) or other suitable component of the vehicle to connect wheel and brake assembly 30 to the vehicle.

During operation of the vehicle, braking may be necessary from time to time, such as during landing and taxiing procedures of an aircraft. Wheel and brake assembly 30 is configured to provide a braking function to the vehicle via actuator assembly 40 and brake stack 42. Actuator assembly 40 includes actuator housing 44 and ram 47. Actuator assembly 40 may include different types of actuators such as one or more of, e.g., an electrical-mechanical actuator, a hydraulic actuator, a pneumatic actuator, or the like. During operation, ram 47 may extend away from actuator housing 44 to axially compress brake stack 42 against compression region 60 for braking. Brake stack 42 includes interleaved rotor brake discs 50 and stator brake discs 52.

Rotor brake discs 50 are slidably engaged (e.g., slip fit) with rotor drive keys 12 for common rotation with tubewell 20 and rotor drive keys 12. Stator brake discs 52 are mounted to torque tube 54 by splines 56. In the example of FIG. 2, brake stack 42 includes four rotors and five stators. However, a different number of rotors and/or stators may be included in brake stack 42 in other examples. Rotor brake discs 50 and stator brake discs 52 may provide opposing friction surfaces for braking an aircraft. In some examples, wheel and brake assembly 30 may include a thermal barrier between rotor brake discs 50 and tubewell 20 in order to, for example, limit thermal transfer between brake stack 42 and wheel 10.

In some examples, splines 56 may be circumferentially spaced about an outer portion of torque tube 54. Stator brake discs 52 may include a plurality of radially inwardly disposed lug notches along an inner diameter of the brake disc configured to engage with splines 56. Similarly, rotor brake discs 50 may include a plurality of radially inwardly disposed drive slots along an outer periphery (e.g., an outer diameter in the case of a disc having a circular cross-section) of the rotor brake disc. The drive slots may be configured to engage with rotor drive keys 12. As such, rotor brake discs 50 will rotate with the motion of wheel 10 while stator brake discs 52 remain stationary, allowing the friction surfaces of an adjacent stator brake discs 52 and rotor brake discs 50 to engage with one another to deaccelerate the rotation of wheel 10.

Figure 3:
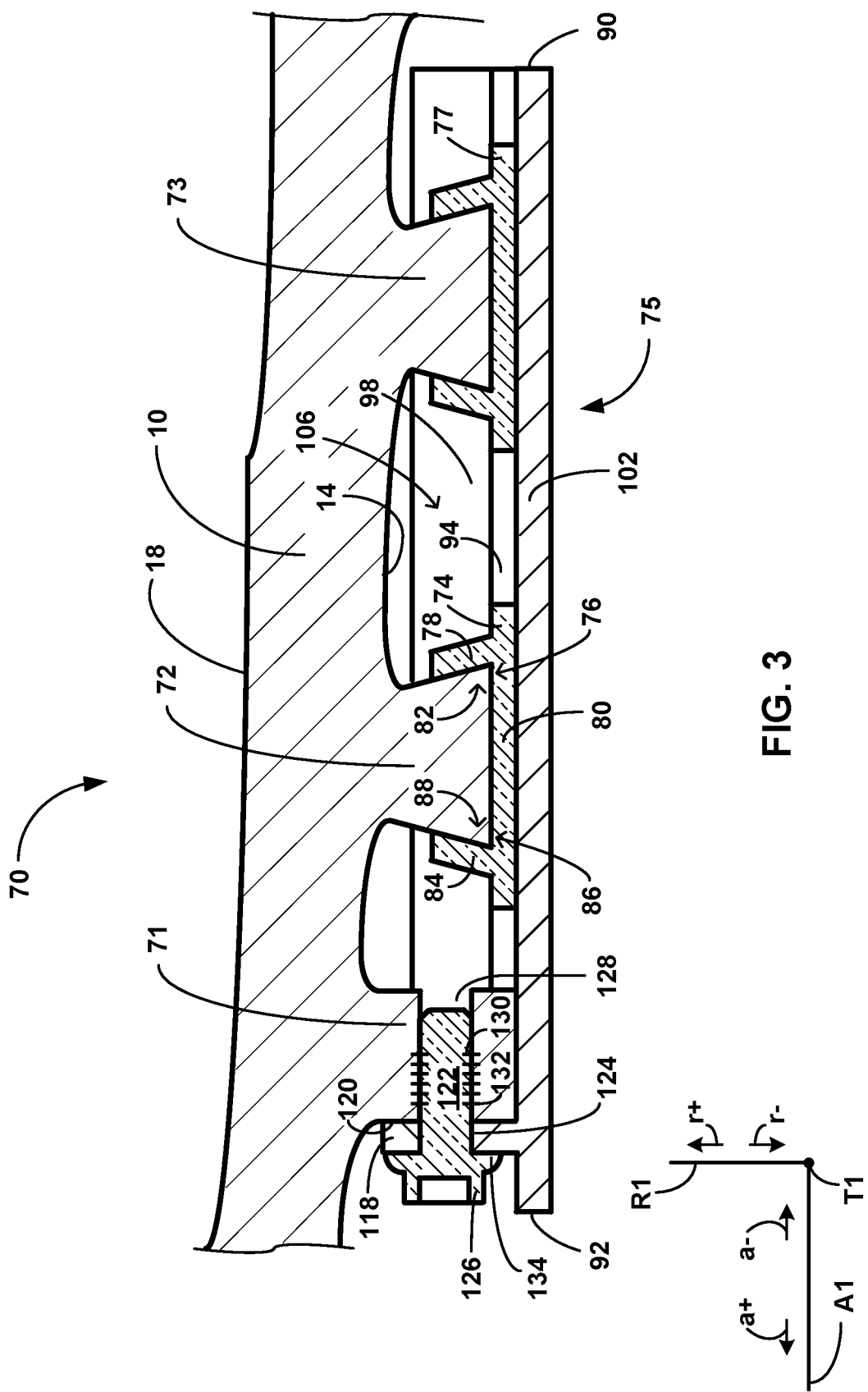
FIG. 3 is a plan view with selected cross-sections of an example assembly including a rotor drive key and an insert on an interior surface of a wheel.

FIG. 3 illustrates an example rotor drive key assembly 70 including an insert 74 and a rotor drive key 75, and depicts a cross-section of an example wheel 10 defining exterior surface 18 and interior surface 14, the cross-section being taken parallel to axial direction A in FIG. 1. Interior surface 14 defines wheel boss 71, wheel boss 72, and wheel boss 73, which are aligned with each other along a direction parallel to axis A. Wheel bosses 71-73 protrude from interior surface 14 in a generally radial direction R1 of wheel 10. Although three wheel bosses 71-73 are shown in FIG. 3, in other examples, wheel 10 can include any suitable number of wheel bosses aligned with each other along the direction parallel to axis A.

Figure 4:
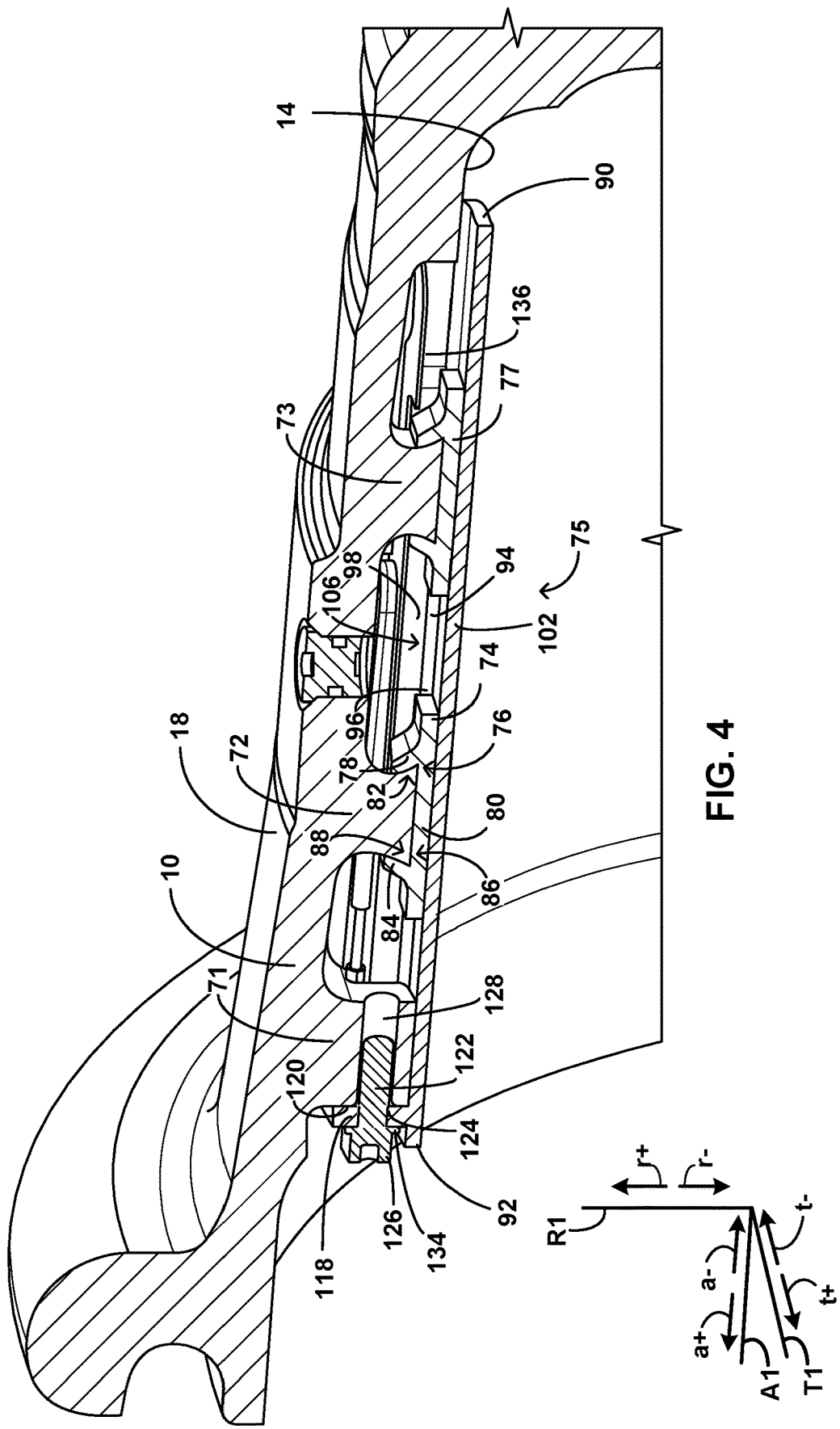
FIG. 4 is a perspective view of an example rotor drive key and an example insert on an interior surface of a wheel.

In FIG. 3, a line A1 is coincident with the axis of rotation A of wheel 10 (FIGS. 1 and 2) and illustrates the axial direction of wheel 10. A line R1 is perpendicular to and intersects the line A1 and indicates a radial direction of wheel 10. A line T1 is perpendicular to both line A1 and line R1 and indicates a tangential direction of wheel 10 (line T1 is perpendicular to the page in FIG. 3). FIG. 4 is an example perspective view of wheel 10 and assembly 70 of FIG. 3, illustrated with respect to lines A1, R1, and T1. FIG. 5 illustrates a perspective view of an example insert 74. FIG. 6 illustrates a perspective view of an example rotor drive key 75. FIGS. 5 and 6 include lines A1, R1, and T1 of wheel 10 for reference to FIGS. 3 and 4, however such an orientation of insert 74 and/or rotor drive key 75 is not required. Insert 74 and/or rotor drive key 75 may have any orientation relative to a wheel when not installed on wheel 10.

Although the configuration of rotor drive key 75 and insert 74 may be mainly discussed and illustrated with respect to wheel boss 72 in some of the following discussion and figures, it is understood that rotor drive key 75 and insert 74 may have substantially similar relationships with any of the other wheel bosses of wheel 10, such as wheel boss 71, wheel boss 73, and/or other wheel bosses which may be present on wheel 10.

Insert 74 is configured to mechanically connect wheel boss 72 and rotor drive key 75. As discussed in further detail below, insert 74 is configured to mate with wheel boss 72 such that relative motion of insert 74 is limited in at least a radial direction R1 of wheel 10 and, in some examples, in an axial direction A1 of wheel 10. Rotor drive key 75 is configured to mate with insert 74 such that relative motion of rotor drive key 75 is limited in at least a radial direction R1 when insert 74 is mated with wheel boss 72. Insert 74 may thus function to mechanically connect wheel boss 72 and rotor drive key 75, substantially stabilizing rotor drive key 75 (relative to wheel boss 72) in at least a radial direction R1 of wheel 10 during, for example, operations of wheel and brake assembly 30.

Insert 74 is configured to establish a mating connection with wheel boss 72, the mating connection being configured to enable insert 74 to resist movement relative to wheel boss 72 in the radial direction R1 of wheel 10. Insert 74 and wheel boss 72 are configured such that, when insert 74 is mated with wheel boss 72 and experiences a force in a direction parallel to a radial direction R1 of wheel 10, wheel boss 72 exerts a reaction force on insert 74 in an opposing direction. For example, when insert 74 mates with wheel boss 72 and insert 74 experiences a force in the direction r− (FIG. 3-4), wheel boss 72 exerts a reaction force in the direction r+. When insert 74 mates with wheel boss 72 and insert 74 experiences a force in the direction r+, wheel boss 72 exerts a reaction force in the direction r−. The opposing reaction force of wheel boss 72 acts to limit relative movement of insert 74 in the radial direction R1 of wheel 10 during operations of, for example, wheel and brake assembly 30.

In some examples, insert 74 is configured to be mated with wheel boss 72 by translating insert 74 over wheel boss 72 in a tangential direction T1 of wheel 10 (e.g., in the direction t− and/or t+(FIGS. 3-4)). Configuring insert 74 to establish the mating connection with wheel boss 72 by translating over wheel boss 72 in the tangential direction T1 of wheel 10 may facilitate relatively easy assembly and disassembly of assembly 70.

Figure 7B:
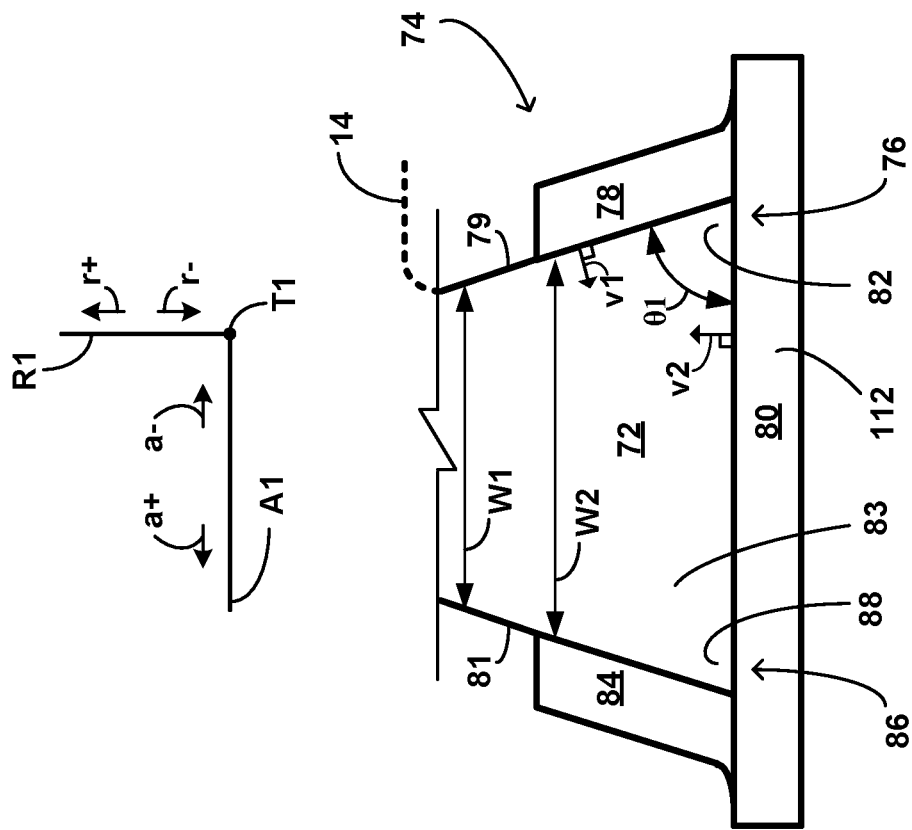
FIG. 7B is another plan view of the example insert and the section of the example wheel boss of FIG. 7A.
Figure 7A:
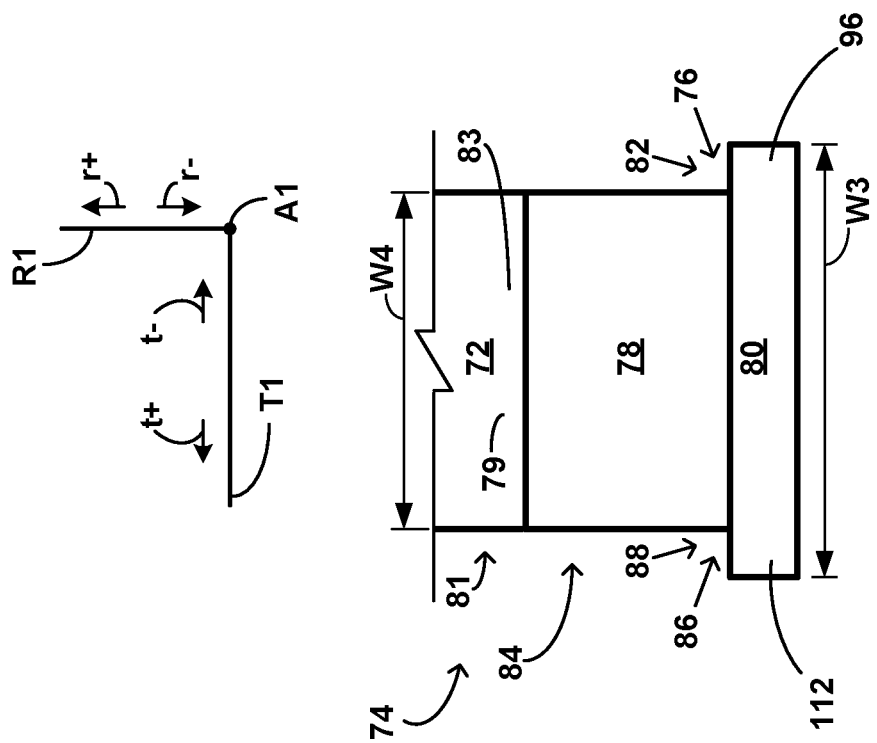
FIG. 7A is a plan view of an example insert and a section of an example wheel boss.

FIGS. 7A and 7B illustrate example insert 74 mated with a section of wheel boss 72. Lines A1, R1, and T1 are provided for reference to FIGS. 3-6. As shown in FIGS. 3-5, 7A and 7B, in some examples, insert 74 defines an insert recess 76 configured to receive a protrusion 82 defined by wheel boss 72 ("boss protrusion 82"), e.g., to mate insert 74 with wheel boss 72. Boss protrusion 82 may be defined by an outer profile of wheel boss 72 (e.g., a profile defined in a plane which includes a vector parallel to the axial direction A1 and/or includes a vector parallel to the radial direction R1). Insert 74 defines insert recess 76 such that, when insert recess 76 receives boss protrusion 82 and insert 74 experiences a force in a direction parallel to a radial direction R1, wheel boss 72 exerts an opposing reaction force on insert 74 to limit relative movement of insert 74 in the radial direction R1 of wheel 10. Insert recess 76 may be configured to receive boss protrusion 82 when insert 74 translates over wheel boss 72 in a tangential direction T1 of wheel 10.

Wheel boss 72 may be configured to have an outward taper defining boss protrusion 82. The outward taper may cause a width of wheel boss 72 substantially parallel to the axial direction A1 to progressively increase as wheel boss 72 extends in a radial direction R1 away from the interior surface 14 of wheel 10. For example, as illustrated in FIG. 7B, wheel boss 72 defines a first width W1 and extends in a radial direction R1 away from interior surface 14 of wheel 10 to define a second width W2. First width W1 and second width W2 are measured in a direction along axis A1 from axial boss side 79 to axial boss side 81. Axial boss side 79 substantially faces in the axial direction a−, while axial boss side 81 faces in a direction substantially opposite axial boss side 79 (e.g., in the axial direction a+). Wheel boss 72 is tapered in the radial direction r+ such that second width W2 is greater than first width W1. In some examples, insert 74 may be configured to substantially conform and/or complement the outward taper of wheel boss 72 when insert 74 mates with wheel boss 72.

Insert recess 76 has an inner profile substantially conforming and/or complementing the outer profile of boss protrusion 82 when insert 74 is mated with wheel boss 72. For example, insert recess 76 may be configured to enable insert 74 to substantially dovetail with boss protrusion 82, e.g., such that insert recess 76 substantially form-fits boss protrusion 82 over at least some portion of boss protrusion 82. The inner profile may include linear segments, curved segments, and/or curvilinear segments, and may be defined in a plane which includes a vector parallel to the axial direction A1 and/or includes a vector parallel to the radial direction R1. In an example, the inner profile of insert recess 76 conforms and/or complements the outer profile of wheel boss 72 such that a vector v1 (FIG. 7B) normal to and originating at first portion of the inner profile and a vector v2 (FIG. 7B) normal to and originating at a second portion of the inner profile intersects the outer profile of boss protrusion 82 when insert 74 mates with wheel boss 72, and the vector v1 has a component parallel to the radial direction R1 opposite that of the vector v2 (e.g., v1 has a component in the direction r− while v2 has a component in the direction r+). In some examples, insert recess 76 may be defined by a concave surface configured to complement a convex surface of wheel boss 72.

An inner surface of insert 74 defining insert recess 76 may be configured to engage (e.g., contact and/or frictionally engage) boss protrusion 82 when insert recess 76 receives boss protrusion 82. In some examples, insert recess 76 is configured to provide an engineering fit with boss protrusion 82, such as a sliding fit, a locational fit, a transitional fit, or an interference fit. In some examples, insert 74 is configured to receive a fixation mechanism, such as a bolt or screw configured to extend through insert 74 and into wheel boss 72, when insert recess 76 has received boss protrusion 82 to help further secure insert 74 to wheel boss 72. In other examples, however, no additional fixation mechanism is used to secure insert 74 to wheel boss 72.

In some examples, insert 74 includes an elongated insert brace 78 extending from an insert base 80 and defining insert recess 76. Insert brace 78 and insert base 80 may meet at a common boundary (e.g., an internal corner) and define an angle θ1 (FIG. 7B) between insert brace 78 and insert base 80. Angle θ1 may be in a plane perpendicular to the axial direction A1 and the tangential direction T1 of wheel 10, and may be less than 90 degrees. Boss protrusion 82 may extend outwardly from a body 83 of wheel boss 72 ("boss body 83") in a substantially axial direction A1 of wheel 10 (e.g., in the direction a−), and insert recess 76 may be configured to extend inwardly in a substantially similar axial direction A1 of wheel 10 (e.g., the direction a−) in order to receive boss protrusion 82. Elongated insert brace 78 and insert base 80 may define insert recess 76 to limit relative movement of insert 74 in at least the radial direction R1 (FIG. 3-5, 7A, 7B). For example, when insert 74 experiences a force in the direction r+, insert brace 78 and insert base 80 may be configured such that wheel boss 72 exerts a reaction force on at least insert base 80 in the direction r−. When insert 74 experiences a force in the direction r−, insert brace 78 and insert base 80 may be configured such that wheel boss 72 exerts a reaction force on at least insert brace 78 in the direction r+.

In some examples, insert 74 includes a second insert brace 84 extending from insert base 80. Insert brace 84 may define a second insert recess 86, with insert recess 86 configured to receive a second boss protrusion 88 of wheel boss 72 on an opposite side of wheel boss 72 from boss protrusion 82 (FIGS. 3-5, 7A, 7B)). Boss protrusion 88 may extend outwardly from boss body 83 in a substantially axial direction A1 opposite that of boss protrusion 82 (e.g., in the direction a+), and may be configured with respect to wheel boss 72 in a manner similar to the configuration of boss protrusion 82. In some examples, an outward taper of wheel boss 72 may define boss protrusions 82, 88. Insert brace 84 and insert base 80 are configured such that when insert recess 86 receives boss protrusion 88 and insert 74 experiences a force in a direction parallel to a radial direction R1, wheel boss 72 exerts a reaction force on insert 74 in an opposing direction. Insert brace 84 and insert recess 86 may be configured with respect to boss protrusion 88 and insert base 80 in a manner similar to the configuration of insert brace 78 and insert recess 76 with respect to boss protrusion 82 and insert base 80.

The mating of insert 74 and wheel boss 72 may also act to limit relative motion of insert 74 in an axial direction A1 of wheel 10 (e.g., the direction a+ and/or a− (FIGS. 3-5, 7A, 7B)). Insert 74 may be configured such that, when insert 74 mates with wheel boss 72 and experiences a force in a direction parallel to an axial direction A1, wheel boss 72 exerts a reaction force on insert 74 in an opposing direction. For example, when insert 74 mates with wheel boss 72 and experiences a force in the direction a+(FIG. 3-4, 7A, 7B), wheel boss 72 may exert a reaction force in the direction a− (e.g., on insert brace 78). When insert 74 mates with wheel boss 72 and experiences a force in the direction a−, wheel boss 72 may exert a reaction force in the direction a+(e.g., on insert brace 84). The opposing reaction forces of wheel boss 72 on insert 74 when insert 74 mates with wheel boss 72 act to limit relative movement of insert 74 in the axial direction A1 of wheel 10.

In examples in which insert 74 includes braces 78, 84, insert 74 may be configured such that insert brace 78 and insert brace 84 substantially bracket wheel boss 72 when insert 74 mates with wheel boss 72 (e.g., when insert recess 76, 86 receives respective boss protrusion 82, 88). For example, insert brace 78 may be adjacent a first side of wheel boss 72 and insert brace 84 may be adjacent a second side of wheel boss 72 opposite the first side. In some examples, insert brace 78 and insert brace 84 may be attached to and separated by insert base 80, with insert base 80 defining a displacement between insert brace 78 and insert brace 84 in an axial direction A1 of wheel 10. For example, insert braces 78, 84 and insert base 80 have a unibody construction (e.g., formed from one continuous piece of material). In other examples, insert braces 78, 84 may be physically separate from insert base 80 and connectable to insert base 80 to form insert 74.

In some examples, insert brace 78 and insert brace 84 may be configured to define profiles having reflective symmetry (within manufacturing tolerances) with respect to a line intersecting insert base 80 (e.g., a line substantially perpendicular to insert base 80). In other examples, insert brace 78 and insert brace 84 define asymmetric profiles with respect to the line intersecting insert base 80.

As shown in FIG. 3, in some examples, assembly 70 may include one or more additional inserts mated with a wheel boss, such as insert 77 (FIG. 3, 4) mated with wheel boss 73. Insert 77 may be configured with respect to wheel boss 73 and rotor drive key 75 in the same manner as insert 74 with respect to wheel boss 72 and rotor drive key 75. Rotor drive key 75 may mate with insert 77 in the same manner as that described for insert 74. In other examples, however, assembly 70 can have only one insert 74 mechanically connecting rotor drive key 75 and wheel boss 72.

As discussed above, insert 74 may mate with wheel boss 72 such that wheel boss 72 limits relative motion of insert 74 in a radial direction R1 of wheel 10. Insert 74 may mate with wheel boss 72 such that wheel boss 72 limits relative motion of insert 74 in an axial direction A1 of wheel 10. In some examples, insert 74 is configured to mate with wheel boss 72 when insert 74 translates over wheel boss 72 in a tangential direction T1 of wheel 10.

Rotor drive key 75 is configured to mate with insert 74 (FIGS. 3, 4, 6) in order to mechanically connect rotor drive key 75 to wheel boss 72. Rotor drive key 75 is configured such that insert 74 limits relative movement of rotor drive key 75 in at least the radial direction R1 of wheel 10 when rotor drive key 75 is mated with insert 74 and insert 74 is mated with wheel boss 72. Insert 74 is configured to reside between rotor drive key 75 and wheel boss 72 when insert 74 mechanically connects rotor drive key 75 and wheel boss 72. As used herein, in some cases, "mechanically connect" can mean that, when rotor drive key 75 is mated with insert 74 and insert 74 is mated with wheel boss 72, insert 74 limits relative motion of rotor drive key 75 in at least a radial direction R1 of wheel 10 (e.g., in the direction r− and/or r+ (FIG. 3,4, 8A, 8B)). For example, when insert 74 mechanically connects rotor drive key 75 and wheel boss 72, when rotor drive key 75 experiences a force in at least a radial direction R1 of wheel 10 (e.g., the direction r+ and/or r− (FIGS. 3, 4)), insert 74 acts to transmit at least some portion of the force on rotor drive key 75 to wheel boss 72. Similarly, when insert 74 experiences a reaction force from wheel boss 72 in at least a radial direction R1 of wheel 10, insert 74 may act to transmit at least some portion of the reaction force to rotor drive key 75.

Rotor drive key includes a first end 90 ("key first end 90") and a second end 92 ("key second end 92"). When rotor drive key 75 mates with insert 74 and insert 74 is mated with wheel boss 72, a force in a direction parallel to a radial direction R1 of wheel 10 causes insert 74 to exert a reaction force on rotor drive key 75 in an opposing direction. For example, when insert 74 is mated with wheel boss 72 and rotor drive key 75 experiences a force in the direction r− (FIG. 3-4), insert 74 exerts a reaction force in the direction r+. When insert 74 is mated with wheel boss 72 and rotor drive key 75 experiences a force in the direction r+, insert 74 exerts a reaction force in the direction r−. The opposing reaction forces of insert 74 act to limit relative movement of rotor drive key 75 in the radial direction R1 of wheel 10. In examples, rotor drive key 75 is configured to mate with insert 74 when rotor drive key is translated over insert 74 and wheel boss 72 in an axial direction A1 of wheel 10 (e.g., in the direction a+(FIGS. 3-4)). Configuring rotor drive key to mate with insert 74 by translating over insert 74 in the axial direction A1 may facilitate relatively easy assembly and disassembly of assembly 70.

FIGS. 8A and 8B illustrate a section of an example rotor drive key 75 mated with an example insert 74. Lines A1, R1, and T1 are provided for reference to FIGS. 3-7B. For clarity, portions of rotor drive key 75 are illustrated as cross-sections.

As shown in FIGS. 3, 4, 6, 7A, 7B, 8A, and 8B, rotor drive key 75 may define a key recess 94 configured to receive a protrusion 96 of insert 74 ("insert protrusion 96"). Insert protrusion 96 may extend away from a body 97 of insert 74 ("insert body 97" (FIG. 5, 8A, 8B) in a tangential direction T1 (e.g., the direction t−). Insert body 97 may be a portion of insert base 80, or may be some other part of insert 74. Insert protrusion 96 may be defined by an outer profile of insert 74 (e.g., a profile defined in a plane which includes a vector parallel to the axial direction A1 and/or includes a vector parallel to the radial direction R1). Rotor drive key 75 defines key recess 94 such that, when key recess 94 receives insert protrusion 96 and rotor drive key 75 experiences a force in a direction parallel to a radial direction R1, key recess 94 acts to transmit at least some portion of the force to insert 74. When insert 74 is mated with wheel boss 72, insert 74 exerts an opposing reaction force on rotor drive key 75, limiting relative movement of rotor drive key 75 in the radial direction R1 of wheel 10. Key recess 94 may be configured to receive insert protrusion 96 when rotor drive key 75 translates over insert 74 in an axial direction A1 of wheel 10. For example, key recess 94 may be configured to receive insert protrusion 96 when key recess 94 is aligned with insert protrusion 96 at key first end 90, and rotor drive key 75 is translated over insert 74 in the direction a−.

Key recess 94 may define a recess inner profile substantially conforming and/or complementing the protruding outer profile of insert protrusion 96 when rotor drive key 75 mates with insert 74. Key recess 94 may substantially dovetail with insert protrusion 96, such that key recess 94 substantially form-fits insert protrusion 96 over at least some portion of insert protrusion 96. The recess inner profile may include linear segments, curved segments, and/or curvilinear segments, and may be defined in a plane which includes a vector parallel to the tangential direction T1 and/or includes a vector parallel to the radial direction R1. In an example, the recess inner profile conforms and/or complements the protrusion outer profile of insert 74 such that a vector v3 (FIG. 8A) normal to and originating at first portion of the recess inner profile and a vector v4 (FIG. 8A) normal to and originating at a second portion of the recess inner profile intersects the protrusion outer profile of insert 74 when rotor drive key 75 mates with insert 74, and the vector v3 has a component parallel to the radial direction R1 opposite that of the vector v4 (e.g., v3 has a component in the direction r+ while v4 has a component in the direction r−). In some examples, key recess 94 may be defined by a concave surface configured to complement a convex surface of insert 74 (e.g., a convex surface of insert protrusion 96). In an example, key recess 94 extends inwardly in a tangential direction T1 (e.g., inwardly in the direction t−) in order to establish a mating connection with insert protrusion 96.

An inner surface of key recess 94 may be configured to engage (e.g., contact and/or frictionally engage) insert protrusion 96 when key recess 94 receives insert protrusion 96. In some examples, key recess 94 is configured to provide an engineering fit with insert protrusion 96, such as a sliding fit, a locational fit, a transitional fit, or an interference fit.

As discussed in further detail below, in some examples, rotor drive key 75 may be configured to receive a fixation mechanism, such as a bolt or screw configured to extend through rotor drive key 75 and into insert 74 and/or wheel boss 72, to help further secure insert 74 and rotor drive key 75 when key recess 94 has received insert protrusion 96. In other examples, however, no additional fixation mechanism is used to secure rotor drive key 75 to insert 74.

In examples, rotor drive key includes a key first side 98 defining key recess 94 (FIGS. 3-5, 6, 8A, and 8B). Rotor drive key 75 may be configured such that key first side 98 substantially faces insert 74 and wheel boss 72 when insert 74 mates with wheel boss 72 and rotor drive key 75 mates with insert 74. Key recess 94 may extend over a length of key first side 98 between key first end 90 and key second end 92, and may substantially originate at key first end 90 before extending toward key second end 92. The recess inner profile of key recess 94 may be substantially uniform over its extension along key first side 98, to allow rotor drive key 75 to receive insert protrusion 96 in key recess 94 as rotor drive key 75 is translated over insert 74 in an axial direction A1 of wheel 10 (e.g., in the direction a−). Key first side 98 may define key recess 94 such that, when insert 74 is mated with wheel boss 72, rotor drive key 75 can be positioned on wheel 10 (e.g., installed or removed) by aligning key recess 94 and insert protrusion 96, and then translating rotor drive key 75 in an axial direction A1 (e.g., the direction a− (FIGS. 3, 4, 8A, 8B)) over insert 74.

In examples, key first side 98 extends from a key base section 102 of rotor drive key 75. Rotor drive key 75 may include a key second side 104 extending from a key base section 102 and defining a key trough 106 configured to receive insert 74 when rotor drive key 75 mates with insert 74. Key first side 98, key base section 102, and key second side 104 may be configured to form a substantially U-shaped cross-section 108 (FIG. 8A, illustrated with cross-hatching) defining key trough 106. Key trough 106 extends over some length between key first end 90 and key second end 92, and may substantially originate at key first end 90 to enable drive key trough 106 to receive insert 74 when rotor drive key 75 is translated over insert 74 in an axial direction of wheel 10 (e.g., in the direction a− (FIGS. 3, 4, 8A, and 8B)).

In some examples, key second side 104 may include a second key recess 110 (FIG. 6, FIG. 8A) extending over some length of key second side 104 between key first end 90 and key second 92. Key recess 110 may be configured to receive a second insert protrusion 112 of insert 74 (FIGS. 5, 7A, 7B, 8A, and 8B)). Insert protrusion 112 may extend outwardly from insert 74 in a substantially tangential direction T1 opposite that of insert protrusion 96 (e.g., in the direction t+), and may be configured with respect to insert 74 in a manner similar to the configuration of insert protrusion 96. Key second side is configured such that when key recess 110 receives insert protrusion 112 and rotor drive key 75 experiences a force in a direction parallel to a radial direction R1, rotor drive key 75 transmits at least some portion of the force to insert 74. When key recess 110 receives insert protrusion 112, rotor drive key 75 experiences a force in a direction parallel to a radial direction R1, and insert 74 is mated with wheel boss 72, insert 74 exerts a reaction force on rotor drive key 75 in an opposing direction. Key second side 104 and key recess 110 may be configured with respect to insert protrusion 112 in a manner similar to the configuration of key first side 98 and key recess 94 with respect to insert protrusion 96.

In some examples, as shown in FIGS. 8A and 8B, insert 74 defines a substantially T-shaped cross-section in a plane parallel to radial direction R1 and/or tangential direction T1 of wheel 10 (FIG. 8A). A portion of insert 74 (e.g., one or both inserts brace 78, 84) may define a stem of the T-shaped cross-section while insert protrusion 96 and insert protrusion 112 define a cross bar of the T-shaped cross-section. In examples, a portion of insert 74 (e.g., insert base 80) including insert protrusions 96, 112 defines a width W3 (FIG. 7A) greater than a width W4 defined by wheel boss 72, where the width W3 and the width W4 are measured in a direction substantially parallel to the tangential direction T1 of wheel 10.

Rotor drive key 75 and wheel boss 72 may be configured such that some portion of wheel boss 72 opposes motion of rotor drive key 75 in a tangential direction T1 (e.g., in the direction t− and/or t+) when rotor drive key 75 mates with insert 74 and insert 74 mates with wheel boss 72. For example, rotor drive key 75 may at least partially surround some portion of wheel boss 72 (e.g., with key trough 106 (FIG. 6)) such that a portion of rotor drive key 75 substantially faces wheel boss 72 in the tangential direction T1. As an example, as illustrated by FIGS. 6, 8A, and 8B, rotor drive key 75 may include a bearing surface 114 (e.g., on key first side 98) configured to face a portion of wheel boss 72 when rotor drive key 75 mates with insert 74 and insert 74 mates with wheel boss 72.

Bearing surface 114 of rotor drive key 75 is configured to engage (e.g., contact and/or frictionally engage) wheel boss 72 to substantially limit relative motion of rotor drive key 75 in a tangential direction T1 (e.g., the direction t+(FIG. 3, 4, 8A)). Bearing surface 114 is configured such that, when bearing surface 114 engages wheel boss 72 (e.g., engages boss side 115 (FIG. 8A)), a force on rotor drive key 75 in the tangential direction t+ causes wheel boss 72 to exert a reaction force on bearing surface 114 in the tangential direction t−, in order to maintain rotor drive key 75 in a substantially stationary tangential position relative to wheel boss 72. Bearing surface 114 may extend over any suitable length of rotor drive key 75 between key first end 90 and key second end 92. For example, bearing surface 114 may substantially originate at key first end 90 and terminate at key second end 92. In other examples, bearing surface 114 extends only along a partial length of rotor drive key 75 between key first end 90 and key second end 92. In some examples, bearing surface 114 includes a substantially planar surface (e.g., substantially parallel to the direction R1 and/or the direction A1 of wheel 10). In addition or instead, in other examples, bearing surface 114 includes a surface defining a curvature. In addition, in some examples, bearing surface 114 defines a surface configured to substantially conform with a portion of wheel boss 72.

Rotor drive key 75 (e.g., drive key trough 106) may be configured to wrap around wheel boss 72 such that a bearing surface 116 (FIGS. 6, 8A) defined by key second side 104 substantially faces a side 117 of wheel boss 72 ("boss side 117") opposite boss side 115, in order to oppose relative motion of rotor drive key 75 in a second tangential direction T1 (e.g., the direction t+) of wheel 10. For example, bearing surface 116 may be configured to engage (e.g., contact and/or frictionally engage) boss side 117 (FIGS. 8A, 8B) to substantially limit relative motion of rotor drive key 75 in the tangential direction t− (FIGS. 3, 4, 8A, 8B). Boss side 117 may be configured with respect to wheel boss 72 and insert 74 in a manner similar to the configuration of boss side 115 with respect to wheel boss 72 and insert 74.

Rotor drive key 75 may act to substantially limit relative motion of insert 74 in a tangential direction T1 of wheel 10 when rotor drive key 75 mates with insert 74 and insert 74 mates with wheel boss 72. Rotor drive key 75 may be configured such that, for example, bearing surface 114 and key recess 110 substantially behave as rigid bodies, and forces on key recess 110 at least in a tangential direction T1 transmit through rotor drive key 75 to bearing surface 114. For example, rotor drive key 75 may be configured such that a force F1 (FIG. 8A) in the direction t+ exerted on key recess 110 by insert protrusion 112 transmits at least partially to bearing surface 114, causing bearing surface 114 to exert a force F2 on boss side 115. When bearing surface 114 engages boss side 115, boss side 115 exerts an opposing reaction force F3 on bearing surface 114. The opposing reaction force F3 tends to limit relative motion of rotor drive key 75 in response to the force F1, allowing recess 110 to oppose relative motion of insert 74 in the direction t+.

Bearing surface 116 and key recess 94 may be configured similarly, so that a force opposite F1 exerted on key recess 94 by insert protrusion 96 transmits at least partially to bearing surface 116, and boss side 117 exerts an opposing reaction force to allow recess 94 to oppose relative motion of insert 74 in the direction t−. In a similar manner, surfaces of insert brace 78, insert base 80, and/or insert brace 84 may engage bearing surface 116 in response to a force such as F1, causing boss side 115 to exert a reaction force on bearing surface 114 and oppose relative motion of insert 74 in the direction t+. Surfaces of insert brace 78, insert base 80, and/or insert brace 84 may engage bearing surface 116 in response to a force opposite F1, causing boss side 117 to exert a reaction force on bearing surface 116 to oppose relative motion of insert 74 in the direction t−. Correspondingly, rotor drive key 75 may be configured to substantially trap insert 74 against relative motion in a tangential direction T1 of wheel 10 when insert 74 mates with wheel boss 72.

Thus, to summarize, in some examples, rotor drive key assembly 70 may be configured to mate with and/or engage with wheel boss 72 in a manner which substantially limits movement of insert 74 and rotor drive key 75 relative to wheel 10 when rotor drive key assembly 70 is positioned on wheel 10. Insert 74 may be configured to mate with wheel boss 72 in a manner which limits relative movement of insert 74 in a radial direction R1 and an axial direction A1. Insert 74 may be configured to mate with wheel boss 72 when insert 74 translates over wheel boss 72 in a tangential direction of wheel 10. Rotor drive key 75 may be configured to mate with insert 74 to substantially trap insert 74 against relative movement in the tangential direction T1 of wheel 10, such that insert 74 is substantially secured against relative motion in the radial direction R1, the axial direction A1, and the tangential direction T1 of wheel 10.

When insert 74 is mated with wheel boss 72, rotor drive key 75 mates with insert 74 in a manner limiting relative movement of rotor drive key 75 in a radial direction R1, and may be configured to at least partially surround and engage wheel boss 72 in a manner which limits relative motion of rotor drive key 75 in a tangential direction T1 of wheel 10. Thus, the mating of rotor drive key 75 and insert 74, when insert 74 mates with wheel boss 72, acts to substantially secure rotor drive key 75 against relative motion in at least the radial direction R1 and the tangential direction T1.

In some examples, additional attachment mechanisms can be used to limit movement of rotor drive key 75 relative to wheel 10 in the axial direction A1 of wheel 10. For example, rotor drive key 75 may include a tab 118 (FIGS. 3, 4, 6) configured to engage directly or indirectly with a wheel boss of wheel 10. Tab 118 extends from some portion of rotor drive key 75 (e.g., key base section 102, key first side 98, and/or key second side 104) and is configured to support rotor drive key 75 against substantial relative motion in an axial direction A1 of wheel 10 when rotor drive key 75 mates with insert 74. Tab 118 includes tab bearing surface 120 configured to substantially face some portion of wheel boss 71 and oppose movement of rotor drive key 75 in an axial direction A1 (e.g., direction a+(FIG. 3, 4)). Tab 118 may be located at any point between or including key first end 90 and key second end 92. In an example, tab 118 is located at or near key second end 92 and rotor drive key 75 is configured to be positioned over (e.g., installed) wheel boss 72 with key first end 90 as the leading end without interference from tab 118. A fastener 122 (FIG. 3,4) may be inserted through both tab 118 and a wheel boss (e.g., wheel boss 71) to limit movement of tab 118 relative to wheel 10, e.g., to secure tab 118 in a substantially stationary position relative to wheel 10.

Although the configuration of tab 118 may be mainly discussed and illustrated with respect to wheel boss 71 in the some of the following discussion and figures, it is understood that tab 118 may have substantially similar relationships with any of the other wheel bosses of wheel 10, such as wheel boss 72, wheel boss 73, and/or other wheel bosses which may be present on wheel 10.

Tab bearing surface 120 is configured to substantially face some portion of wheel boss 71 and oppose movement of rotor drive key 75 relative to wheel boss 71 in an axial direction A1 (e.g., direction a+(FIG. 3, 4)). Tab bearing surface 120 is configured such that a force on rotor drive key 75 in the axial direction a− (FIG. 3, 4) causes wheel boss 71 to exert a reaction force on tab bearing surface 120 in the axial direction a+, in order to maintain rotor drive key 75 in a substantially stationary axial position relative to wheel boss 71. In some examples, tab bearing surface 120 is a substantially planar surface (e.g., substantially parallel to the radial direction R1 and/or the tangential direction T1). In addition or instead, in other examples, tab bearing surface 120 includes a surface defining a curvature. In addition, in some examples, tab bearing surface 120 defines a surface configured to substantially conform with a portion of wheel boss 71.

As discussed, tab 118 may be secured in a substantially stationary position (e.g., functionally stationary, though there may be minor relative movements) relative to wheel boss 71 by fastener 122. Tab 118 defines tab aperture 124 (FIGS. 3, 4, 6) configured to receive fastener 122 extending in a substantially axial direction A1 of wheel 10. Tab aperture 124 extends through tab 118 and includes an opening bounded by tab bearing surface 120. Tab aperture 124 is configured to cause tab 118 to engage fastener 122 when fastener 122 extends through tab aperture 124 and into wheel boss 71. For example, tab aperture 124 may be configured such that fastener head 126 (FIG. 3, 4) of fastener 122 acts to compress some portion of tab 118 (e.g., around the perimeter of tab aperture 124) when a shank of fastener 122 extends through tab aperture 124 and engages (e.g., threadably engages) with wheel boss 71. Tab aperture 124 substantially maintains a portion of tab 118 (e.g., the portion of tab 118 surrounding tab aperture 124) between fastener head 126 and wheel boss 71 when fastener 122 engages wheel boss 71, in order to maintain tab 118 and rotor drive key 75 substantially stationary with respect to wheel boss 71.

Fastener 122 may engage wheel boss 71 in a manner which substantially secures fastener 122 against relative motion in at least an axial direction A1 of wheel 10. Fastener 122 may extend into wheel boss 71 via, for example, boss aperture 128 defined by wheel boss 71 (FIGS. 3, 4). In some examples, fastener 122 includes bolt threads 130 configured to threadably engage with boss threads 132 defined by wheel boss 71 within boss aperture 128 to maintain fastener 122 in a substantially stationary position relative to wheel boss 71. Bolt threads 130 may be external threads and boss threads 132 may be internal threads. In some examples, fastener 122 may extend through boss aperture 128 and threadably engage with a nut or other fastening device configured to maintain fastener 122 substantially stationary with respect to wheel boss 71.

In some examples, fastener 122 is configured to substantially maintain tab bearing surface 120 in contact with wheel boss 71, and/or maintain tab bearing surface 120 in contact with one or more materials (e.g., a compression washer) between tab bearing surface 120 and wheel boss 71. Fastener 122 may be configured to substantially maintain some portion of tab 118 (e.g., the portion of tab 118 surrounding tab aperture 124) between fastener head 126 and wheel boss 71 when fastener 122 fastens to wheel boss 71 (e.g., by threadably engaging wheel boss 71, or extending through boss aperture 128 and engaging a nut). For example, fastener 122 may be a flange bolt having flange 134 (FIGS. 3, 4) configured to substantially trap tab 118 between the head of fastener 122 and wheel boss 71 when fastener 122 fastens to wheel boss 71.

In some examples, rotor drive key assembly 70 may include a locking mechanism (not shown) configured to rotationally lock fastener 122 in place. In these examples, fastener 122 may not be threaded. The locking mechanism may include any suitable configuration, such as, but not limited to, one or more of a locking plate, a retainer clip, a lock washer, a Nord-lock washer, a nylon insert, a retainer pin, a castle locking device, an adhesive, a safety wire, a safety cable, a retainer clip, or the like. FIG. 4 also depicts a heat shield 136 which may be deployed on the interior surface 14 of wheel 10.

Figure 9:
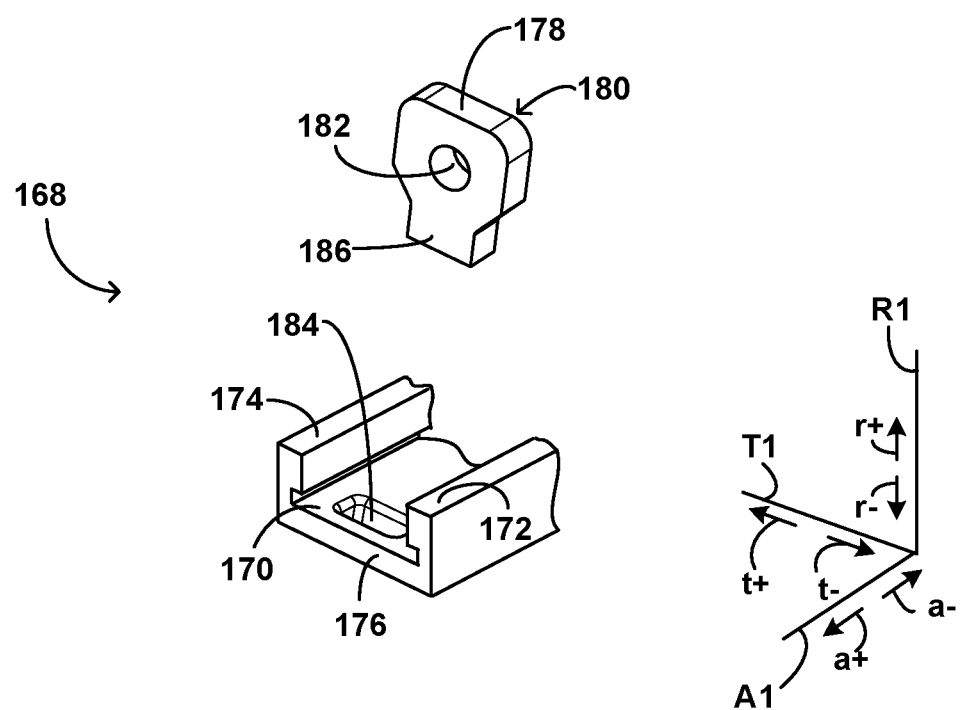
FIG. 9 is a perspective view of an example section of a rotor drive key and a detachable tab.

In some examples, the key base section and the tab of the rotor drive key have a unitary (or unibody) construction and are not separable from each other without adversely impacting the structural integrity of the key base section and/or the tab. In other examples, the key base section and the tab are separable components of the rotor drive key. For example, FIG. 9 illustrates an example including a portion of a rotor drive key 168 including key base section 170, key first side 172, key second side 174, key second end 176, and a detachable tab 178. Detachable tab 178 is physically separate from and configured to mechanically connect to key base section 170. Detachable tab 178 defines tab bearing surface 180 and tab aperture 182. Rotor drive key 168, key base section 170, key first side 172, key second side 174, key second end 176, detachable tab 178, tab bearing surface 180, and tab aperture 182 may be configured individually and relation to other components of rotor drive key 168 in the same manner as that discussed for key base section 102, key first side 98, key second side 104, and key second end 92 relative to the other components of rotor drive key 75.

Detachable tab 178 is configured to insert into a supporting recess 184 defined by key base section 170. Supporting recess 184 may be located within key base section 170 at any point between or including second body end 176 and a first body end of rotor drive key 168 (not shown). In an example, supporting recess 184 is located substantially at second body end 176. Tab 178 may include a tab protrusion 186 configured to insert into supporting recess 184. Tab protrusion 186 may be configured to provide an engineering fit within supporting recess 184, such as a sliding fit, a locational fit, a transitional fit, or an interference fit. When tab protrusion 186 is inserted into supporting recess 184, detachable tab 178, tab bearing surface 180, and tab aperture 182 may be configured individually and relation to other components of rotor drive key 168 in the same manner as that discussed for tab 118, tab bearing surface 120, and tab aperture 124 relative to the other components of rotor drive key 75.

Use of detachable tab 178 allows detachable tab 178 and key base section 170, key first side 172, and/or key second side 174 to be constructed of differing materials, and may enhance the manufacturability. For example, key base section 170, key first side 172, and/or key second side 174 may define a substantially similar cross-section (e.g., perpendicular to axial direction A1) between second body end 176 and the first body end of rotor drive key 168, allowing key base section 170, key first side 172, and/or key second side 174 to be formed at least in part by as an extrusion or a drawing (e.g., formed by extruding or drawing). This may simplify the use of materials such as extruded composites, certain thermal insulative materials, or other particular materials which may be more difficult to form with non-extruding (or drawing) fabrication methods.

Figure 10B:
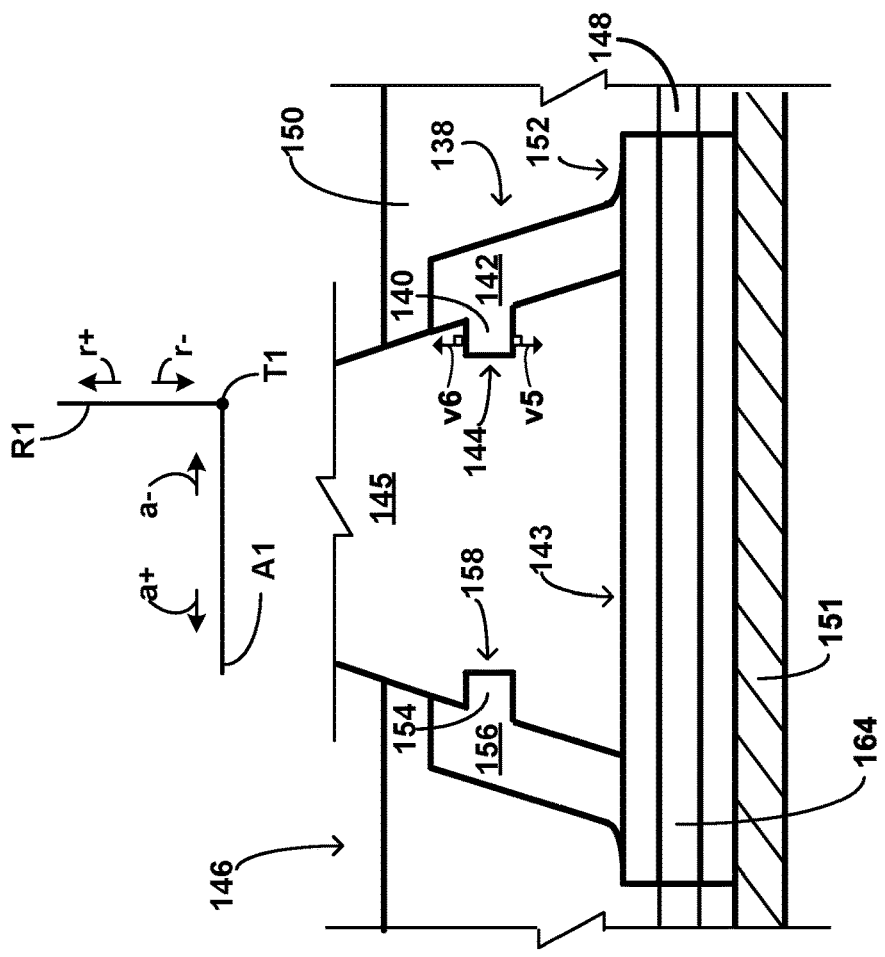
FIG. 10B is another plan view with selected cross-sections of an example rotor drive key having the protrusion, an example insert, and the section of an example wheel boss of FIG. 10A.
Figure 10A:
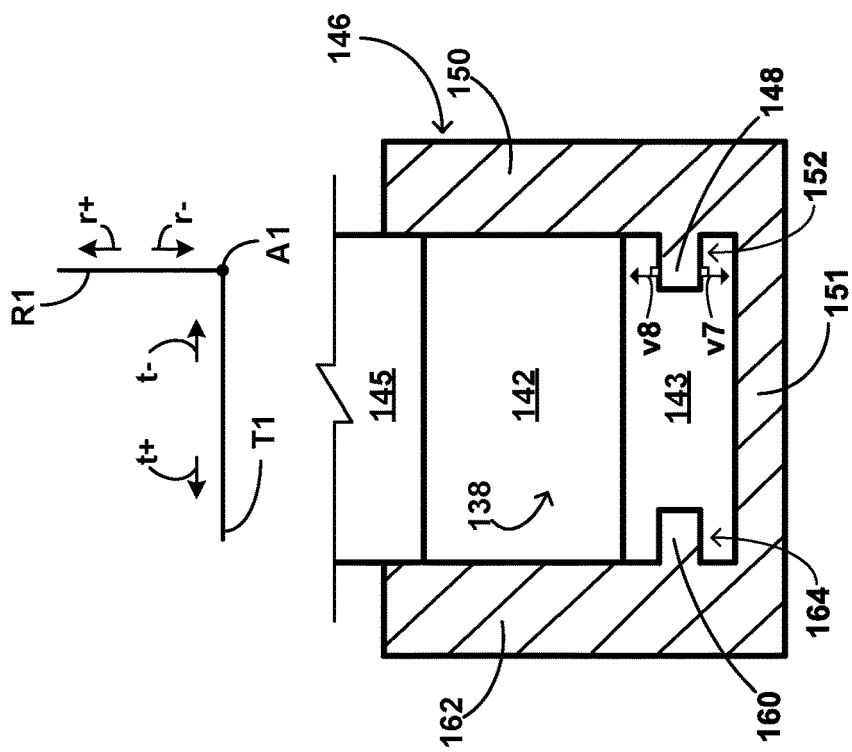
FIG. 10A is a plan view with selected cross-sections of an example rotor drive key having a protrusion, an example insert, and a section of an example wheel boss.

Inserts configured to connect rotor drive keys to a wheel boss of a wheel can have any suitable configuration that enables the inserts to mate with a wheel boss. For example, as illustrated in FIGS. 10A and 10B, insert 138 may include an insert lateral protrusion 140 instead of or in addition to insert recess 76. In some examples, insert lateral protrusion 140 may extend from insert brace 142, which may extend from insert base 143. Insert lateral protrusion 140 may be configured to insert into a boss lateral recess 144 to mate insert 138 with wheel boss 145 and limit relative motion of insert 138 in at least the radial direction R1. An outer surface of insert 138 defining insert lateral protrusion 140 may be configured to engage (e.g., contact and/or frictionally engage) an inner surface of boss lateral recess 144 when insert lateral protrusion 140 inserts into boss lateral recess 144. In some examples, insert lateral protrusion 140 is configured to provide an engineering fit with boss lateral recess 144 such as a sliding fit, a locational fit, a transitional fit, or an interference fit. Insert 138 defines insert lateral protrusion 140 such that, when insert lateral protrusion 140 inserts into boss lateral recess 144 and insert 138 experiences a force in a direction parallel to a radial direction R1, wheel boss 145 exerts an opposing reaction force on insert 138 to limit relative movement of insert 138 in the radial direction R1 of wheel 10. Insert lateral protrusion 140 may be configured to insert into boss lateral recess 144 when insert 138 translates over wheel boss 72 in a tangential direction T1 of wheel 10.

Insert lateral protrusion 140 may have an outer profile substantially conforming with and/or complementing an inner profile of boss lateral recess 144 when insert 138 mates with wheel boss 145. The outer profile of insert lateral protrusion 140 may include linear segments, curved segments, and/or curvilinear segments, and may be defined in a plane parallel to the axial direction A1 and/or parallel to the radial direction R1. Insert lateral protrusion 140 may be defined by a convex surface configured to complement a concave surface of wheel boss 145. In an example, the outer profile of insert lateral protrusion 140 conforms and/or complements the inner profile of boss lateral recess 144 such that a vector v5 normal to and originating at a first portion of the outer profile and a vector v6 normal to and originating at a second portion of the outer profile intersects the inner profile of boss lateral recess 144 when insert 138 mates with wheel boss 145, and the vector v5 has a component parallel to the radial direction R1 opposite that of the vector v6 (e.g., v5 has a component in the direction r− while v6 has a component in the direction r+).

Rotor drive keys described herein can have any suitable configuration that enables the rotor drive keys to mate with inserts. In some examples, as illustrated in FIGS. 10A and 10B, rotor drive key 146 may include a key protrusion 148 instead of or in addition to key recess 94. In some examples, key protrusion 148 may extend from key first side 150, which may extend from key base section 151. Key protrusion 148 may be configured to insert into an insert lateral recess 152 defined by insert 138 to limit relative motion of rotor drive key 146 in at least the radial direction R1 when rotor drive key 146 mates with insert 138 and insert 138 mates with wheel boss 145. An outer surface of rotor drive key 146 defining key protrusion 148 may be configured to engage (e.g., contact and/or frictionally engage) an inner surface of insert lateral recess 152 when key protrusion 148 inserts into insert lateral recess 152. In some examples, key protrusion 148 is configured to provide an engineering fit with insert lateral recess 152 such as a sliding fit, a locational fit, a transitional fit, or an interference fit. Rotor drive key 146 defines key protrusion 148 such that, when key protrusion 148 inserts into insert lateral recess 152 and insert 138 mates with wheel boss 145, when rotor drive key 146 experiences a force in a direction parallel to a radial direction R1, insert 138 exerts an opposing reaction force on rotor drive key 146 to limit relative movement of rotor drive key 146 in the radial direction R1 of wheel 10. Key protrusion 148 may be configured to insert into insert lateral recess 152 when rotor drive key 146 translates over insert 138 in an axial direction A1 of wheel 10.

Key protrusion 148 may have an outer profile substantially conforming with and/or complementing an inner profile of insert lateral recess 152. The outer profile of key protrusion 148 may include linear segments, curved segments, and/or curvilinear segments, and may be defined in a plane parallel to the radial direction R1 and/or parallel to the tangential direction T1. For example, key protrusion 148 may be defined by a convex surface configured to complement a concave surface of insert 138. In an example, the outer profile of key protrusion 148 conforms and/or complements the inner profile of insert lateral recess 152 such that a vector v7 normal to and originating at a first portion of the outer profile of key protrusion 148 and a vector v8 normal to and originating at a second portion of the outer profile of key protrusion 148 intersects the inner profile of insert lateral recess 152 when rotor drive key 146 mates with insert 138, and the vector v7 has a component parallel to the radial direction R1 opposite that of the vector v8 (e.g., v7 has a component in the direction r− while v8 has a component in the direction r+).

Insert 138 may include a second insert lateral protrusion 154 extending from, e.g. insert brace 156 in direction opposite that of insert lateral protrusion 140. Insert lateral protrusion 154 may be configured to insert into a second boss lateral recess 158. Rotor drive key 146 may include a second key protrusion 160 extending from, e.g. key second side 162 in direction opposite that of key protrusion 148. Key protrusion 160 may be configured to insert into a second insert lateral recess 164. Insert lateral recess 164 may be configured with respect to insert 138, insert brace 156, wheel boss 145, and boss lateral recess 158 in the same manner as the configuration of insert lateral protrusion 140 with respect to insert 138, insert brace 142, wheel boss 145, and boss lateral recess 144. Key protrusion 160 may be configured with respect to rotor drive key 146, key second side 162, wheel boss 145, and insert lateral recess 164 in the same manner as the configuration of key protrusion 148 with respect to rotor drive key 146, key first side 150, wheel boss 145, and insert lateral recess 152. Insert 138 may be an example of insert 74. Insert brace 142, insert base 143, and insert brace 146 may be examples of insert brace 78, insert base 80, and insert brace 84 respectively. Rotor drive key 145 may be an example of rotor drive key 75. Key first side 150, key base section 151, and key second side 162 may be examples of key first side 98, key base section 102, and key second side 104 respectively. Wheel boss 145 may be an example of any of wheel bosses 71-74.

Rotor drive key 75, 146 and/or insert 74, 138 as well as other components described herein, may be made from any suitable material. For example, the material may be any material of suitable strength for the intended use of rotor drive key 75, 146 and/or insert 74, 138. In some examples, the material includes a metal or a metal alloy. For example, the material may include a nickel alloy or steel alloy. As one example, the material may include stainless steel.

Insert 74, 138, rotor drive key 75, 146, fastener 122, and other structures described herein can be formed using any suitable technique. In some examples, insert 74, 138, rotor drive key 75, 146, and/or fastener 122 may be forged, cast, made from bar stock, additive manufactured (e.g., three-dimensionally (3D) printed), extruded, drawn, or be produced using other suitable methods. In some examples, insert 74, 138, rotor drive key 75, 146 and/or fastener 122 may be machined to define the configurations described herein. In other examples, insert 74, 138, rotor drive key 75, 146, and/or fastener 122 may be formed without having to be substantially machined.

In some examples, wheel 10 may be finish machined from a near-net-shaped aluminum forging and contain wheel bosses for assembly of rotor drive key assembly 70 onto wheel 10 using fastener 122 extending through, for example, wheel boss 71 and tab 118. In other examples, wheel 10 may be manufactured in a different manner. In yet other examples, wheel 10 may be obtained rather than manufactured. In some examples, wheel 10 may be obtained and machined to form interior surface 14 including a plurality of wheel bosses. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Wheel 10 may comprise any number of wheel bosses and any number of rotor drive keys 75, 146 and inserts 74, 138. Wheel bosses (including wheel bosses 71-74, 145) protruding from interior surface 14 may extend in a substantially radial direction from adjacent portions of interior surface 14. A wheel boss may extend more radially inward than respective portions of interior surface 14 adjacent to the wheel boss. In some examples, wheel bosses may have any suitable height in the substantially radial direction. Moreover, a plurality of wheel bosses may comprise wheel bosses having the same height or substantially the same height, or comprise wheel bosses having different heights. Similarly, a plurality of wheel bosses may comprise wheel bosses having the same width or substantially the same width, or comprise wheel bosses having different widths. In some examples, wheel bosses may be present at substantially equal circumferential distances around interior surface 14 of wheel 10. In other examples, one or more of a plurality of wheel bosses may be present at different circumferential distances from an adjacent wheel boss. Additionally, wheel bosses may be any suitable distance from each other in the axial direction of wheel 10.

Figure 11:
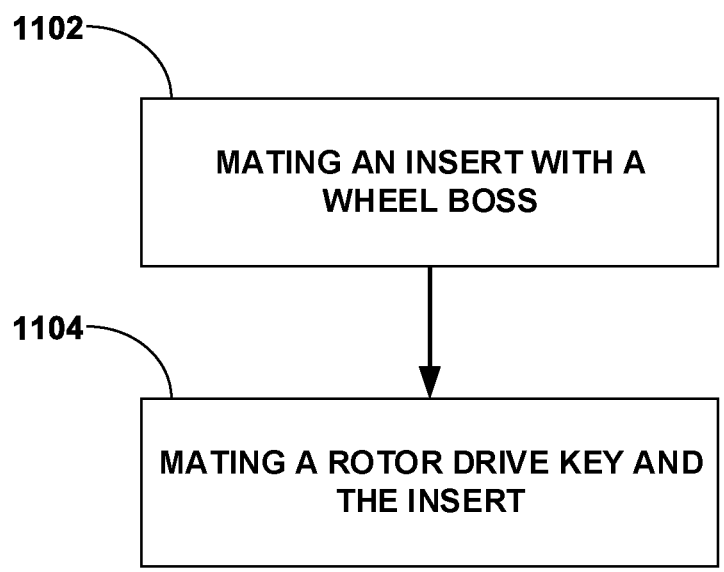
FIG. 11 is a flow diagram illustrating an example technique of attaching a rotor drive key to an interior surface of a wheel.

FIG. 11 is a flow diagram illustrating an example technique for attaching a rotor drive key to an interior surface of a wheel. While the technique is described with reference to specific example rotor drive keys, fasteners, and wheel bosses described herein, the technique may be used with other examples components described herein. The technique includes mating an insert 74, 138 with a wheel boss 72, 145 on interior surface 14 of wheel 10 (1102). In some examples, an operator may mate insert 74, 138 with wheel boss 72, 145 by translating insert 74, 138 over wheel boss 72, 145 in a tangential direction of wheel 10. The insert 74, 138 may define an insert recess 76, 86 and/or an insert lateral protrusion 140, 154 and wheel boss 72, 145 may include boss protrusion 82, 88 and/or boss lateral recess 144, 158. In these examples, the operator may mate insert 74, 138 with wheel boss 72, 145 by introducing boss protrusion 82, 88 into insert recess 76, 86 and/or introducing insert lateral protrusion 140, 154 into boss lateral recess 144, 158.

After the insert 74, 138 is mated with wheel boss 72, 145, the technique includes mating a rotor drive key 75, 146 with insert 74, 138 (1104). For example, an operator may mate rotor drive key 75, 146 with insert 74, 138 by translating rotor drive key 75, 146 over insert 74, 138 in an axial direction of wheel 10. Rotor drive key 75, 146 may define a key recess 94, 110 and/or a key protrusion 148, 160 and insert 74, 138 may define insert protrusion 96, 112 and/or insert lateral recess 152, 164. In these examples, the operator may mate rotor drive key 75, 146 with insert 74, 138 by introducing insert protrusion 96, 112 into key recess 94, 110 and/or introducing key protrusion 148, 160 into insert lateral recess 152, 164.

In some examples, the operator can slide rotor drive key 75, 146 over insert 74, 138 until tab 118 (e.g. tab bearing surface 120) engages a bearing surface of wheel boss 71, 145, or one or more materials between tab 118 and wheel boss 71, 145, such that tab 118 acts as a stop. After the rotor drive key 75, 146 is positioned over insert 74, 138, such that the respective tab 118 engages a bearing surface of wheel boss 71, 145, or is otherwise near the bearing surface of wheel boss 71, 145, the operator can position fastener 122 through rotor drive key 75, 146. For example, the operator can extend fastener 122 through tab aperture 124 of tab 118 in an axial direction A1 of wheel 10 and into boss aperture 128. In some examples, the operator places a washer and/or gasket between fastener head 126 and tab 118. The operator can engage a locking mechanism with fastener 122 (e.g., inserting a retainer through fastener head 126, placing a locking plate between fastener head 126 and tab 118, and the like) to fix the position of fastener 122 relative to rotor drive key 75.

After fastener 122 is extended through tab 118, the operator can engage fastener 122 and wheel 10. For example, the operator can threadably engage bolt threads 130 and boss threads 132 of wheel boss 71, 145. In some examples, the operator applies a torque to fastener head 126 to engage bolt threads 130 and boss threads 132. Torqueing fastener head 126 can compress some portion of tab 118 (e.g., the portion surrounding tab aperture 124) between fastener head 126 and wheel boss 71, 145.

Although FIG. 11 is described with reference to a technique performed by an operator, in some examples, all or part of the technique shown in FIG. 11 can be automatically performed by a machine.

Various examples have been described. These and other examples are within the scope of the following claims.

What is claimed is:

1. An assembly comprising:
   an insert configured to mate with a wheel boss of a wheel; and
   a rotor drive key configured to mate with the insert, wherein the insert is between a first portion of the rotor drive key and the wheel boss when the insert mates with the wheel boss and the rotor drive key mates with the insert, and
   wherein a second portion of the rotor drive key is configured to engage the wheel boss when the rotor drive key mates with the insert.

2. The assembly of claim 1, wherein the insert defines at least one of a recess configured to receive a protrusion defined by the wheel boss or a protrusion configured to insert in a recess defined by the wheel boss to mate with the wheel boss.

3. The assembly of claim 1, wherein the rotor drive key defines at least one of a recess configured to receive a protrusion defined by the insert or a protrusion configured to insert in a recess defined by the insert to mate with the insert.

4. The assembly of claim 1, wherein the insert is configured to be translated over the wheel boss in a substantially tangential direction of the wheel to mate with the wheel boss.

5. The assembly of claim 1, wherein the insert is configured to limit movement of the insert relative to the wheel boss in a substantially radial direction of the wheel when the insert mates with the wheel boss.

6. The assembly of claim 1, wherein the insert is configured to limit movement of the insert relative to the wheel boss in a substantially axial direction of the wheel when the insert mates with the wheel boss.

7. The assembly of claim 1, wherein the rotor drive key is configured to be translated over the insert in a substantially axial direction of the wheel to mate with the insert.

8. The assembly of claim 1, wherein the insert is configured to limit movement of the rotor drive key relative to the wheel boss in a substantially radial direction of the wheel when the rotor drive key mates with the insert and the insert mates with the wheel boss.

9. The assembly of claim 1, wherein the rotor drive key is configured to limit movement of the insert relative to the wheel boss in a substantially tangential direction of the wheel when the rotor drive key mates with the insert and the insert mates with the wheel boss.

10. The assembly of claim 1, wherein the rotor drive key is configured to receive a fastener in a substantially axial direction of the wheel when the rotor drive key mates with the insert and the insert mates with the wheel boss.

11. The assembly of claim 10, wherein the fastener is configured to engage a portion of the wheel comprising the wheel boss when the rotor drive key receives the fastener in the substantially axial direction of the wheel and when the rotor drive key mates with the insert and the insert mates with the wheel boss.

12. The assembly of claim 1, wherein:
the insert is configured to limit movement of the insert relative to the wheel boss in an axial direction of the wheel and in a radial direction of the wheel when the insert mates with the wheel boss; and
the rotor drive key is configured to limit movement of the insert relative to the wheel boss in a tangential direction of the wheel when the rotor drive key mates with the insert and the insert mates with the wheel boss.

13. The assembly of claim 1 wherein:
the insert is configured to exert a reaction force on the rotor drive key in a substantially radial direction of the wheel when the rotor drive key is mated with the insert and the insert is mated with the wheel boss; and
the insert is configured to exert some portion of the reaction force on the wheel boss when the insert is mated with the wheel boss.

14. An assembly comprising:
a wheel boss extending in a substantially radial direction of a wheel and defining a boss protrusion protruding in a substantially axial direction of the wheel;
an insert defining an insert recess configured to receive the boss protrusion, wherein the insert defines an insert protrusion protruding in a substantially tangential direction of the wheel;
a rotor drive key defining a key recess configured to receive the insert protrusion; and
a fastener,
wherein the rotor drive key is configured to receive the fastener in the substantially axial direction of the wheel, and
wherein the fastener is configured to engage the wheel boss and limit motion of the rotor drive key in the substantially axial direction of the wheel when the rotor drive key receives the fastener.

15. The assembly of claim 14, wherein the insert is configured to receive the boss protrusion when the insert is translated over the wheel boss in the substantially tangential direction of the wheel.

16. The assembly of claim 15, wherein the key recess is configured to receive the insert protrusion when the insert recess receives the boss protrusion and the rotor drive key is translated over the insert in the substantially axial direction of the wheel.

17. The assembly of claim 14, wherein the insert is between a first portion of the rotor drive key and the wheel boss when the insert recess receives the boss protrusion and the key recess receives the insert protrusion, and wherein a second portion of the rotor drive key is configured to engage the wheel boss when the key recess receives the insert protrusion.

18. A method comprising:
mating an insert and a wheel boss of a wheel, wherein the wheel boss extends in a substantially radial direction of the wheel; and
mechanically connecting a rotor drive key and the wheel boss, wherein mechanically connecting the rotor drive key and the wheel boss comprises mating the rotor drive key and the insert, wherein the insert is between a first portion of the rotor drive key and the wheel boss when the insert mechanically connects the rotor drive key with the wheel boss, and wherein a second portion of the rotor drive key engages the wheel boss when the rotor drive key mates with the insert.

19. The method of claim 18 further comprising extending a fastener through the rotor drive key and into the wheel boss in a substantially axial direction of the wheel when the rotor drive key mates with the insert.

20. The method of claim 18,
wherein mating the insert and the wheel boss comprises translating the insert over the wheel boss in a substantially tangential direction of the wheel, and
wherein mating the rotor drive key and the insert comprises translating the rotor drive key over the insert in a substantially axial direction of the wheel.

* * * * *